United States Patent
Yamashita et al.

(10) Patent No.: US 10,407,585 B2
(45) Date of Patent: Sep. 10, 2019

(54) AQUEOUS INK FOR INK JET RECORDING, AQUEOUS INK SET FOR INK JET RECORDING, AND INK JET RECORDING METHOD

(71) Applicant: FUJI XEROX CO., LTD., Tokyo (JP)

(72) Inventors: Yoshiro Yamashita, Minamiashigara (JP); Takahiro Ishizuka, Minamiashigara (JP); Mamoru Fujita, Ebina (JP); Kazuhiko Hirokawa, Ebina (JP); Shimpei Takagi, Minamiashigara (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/592,526

(22) Filed: May 11, 2017

(65) Prior Publication Data
US 2018/0086930 A1  Mar. 29, 2018

(30) Foreign Application Priority Data

Sep. 23, 2016  (JP) ................................. 2016-185999
Sep. 23, 2016  (JP) ................................. 2016-186000

(51) Int. Cl.
*C09D 11/38*  (2014.01)
*C09D 11/322*  (2014.01)
(Continued)

(52) U.S. Cl.
CPC ............. *C09D 11/38* (2013.01); *B41M 7/009* (2013.01); *C09D 11/104* (2013.01);
(Continued)

(58) Field of Classification Search
CPC ..... C09D 11/38; C09D 11/322; C09D 11/326; C09D 11/40
See application file for complete search history.

(56) References Cited

U.S. PATENT DOCUMENTS

2003/0117474 A1*  6/2003  Harada ................ C09D 11/328
                                                  347/100
2009/0038507 A1*  2/2009  Akers, Jr. ............. C09D 11/38
                                                  106/31.26
(Continued)

FOREIGN PATENT DOCUMENTS

JP  2001-226618 A  8/2001
JP  2002-080764 A  3/2002
JP  2013-189596 A  9/2013

*Primary Examiner* — Kristal Feggins
*Assistant Examiner* — Kendrick X Liu
(74) *Attorney, Agent, or Firm* — Oliff PLC

(57) ABSTRACT

Provided is an aqueous ink for ink jet recording that includes: water; a water-soluble organic solvent; a coloring material; and a specific compound having a structure expressed by the following General Formula (I), wherein ink pH is in a range of 6.5 to 8.5.

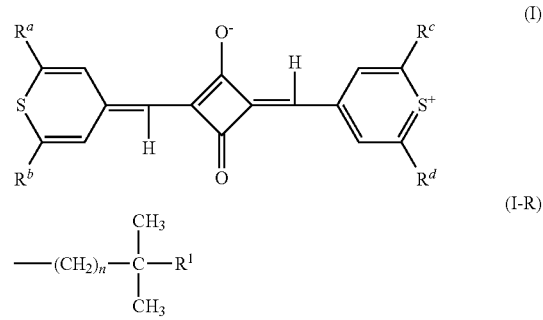

In General Formula (I), $R^a$, $R^b$, $R^c$, and $R^d$ each independently represent a structure expressed by General Formula (I-R) or an alkyl group having 1 to 6 carbon atoms which is not branched, $R^1$ represents a hydrogen atom or a methyl (Continued)

group, and n represents an integer in a range of 0 to 3, and the total carbon number of the structure expressed by General Formula (I-R) is equal to or less than 6.

16 Claims, 3 Drawing Sheets

(51) Int. Cl.
 *C09D 11/326* (2014.01)
 *C09D 11/40* (2014.01)
 *C09D 11/107* (2014.01)
 *C09D 11/104* (2014.01)
 *B41M 7/00* (2006.01)

(52) U.S. Cl.
 CPC .......... *C09D 11/107* (2013.01); *C09D 11/322* (2013.01); *C09D 11/326* (2013.01); *C09D 11/40* (2013.01)

(56) References Cited

U.S. PATENT DOCUMENTS

| | | | | |
|---|---|---|---|---|
| 2012/0247365 | A1* | 10/2012 | Lussier | C09D 11/322 106/31.13 |
| 2015/0093698 | A1* | 4/2015 | Tian | G03G 9/09775 430/108.5 |
| 2017/0114237 | A1* | 4/2017 | Okubo | C09D 11/326 |
| 2017/0291421 | A1* | 10/2017 | Okuda | B41J 2/16508 |
| 2018/0142110 | A1* | 5/2018 | Maeda | C09D 11/10 |

* cited by examiner

AQUEOUS INK FOR INK JET RECORDING, AQUEOUS INK SET FOR INK JET RECORDING, AND INK JET RECORDING METHOD

CROSS-REFERENCE TO RELATED APPLICATION

This application is based on and claims priorities under 35 USC 119 from Japanese Patent Application No. 2016-185999 filed on Sep. 23, 2016 and Japanese Patent Application 2016-186000 filed on Sep. 23, 2016.

BACKGROUND

Technical Field

The present invention relates to an aqueous ink for ink jet recording, an aqueous ink set for ink jet recording, and an ink jet recording method.

Related Art

As compared with the aqueous ink jet recording apparatus for home and offices, an aqueous ink jet recording apparatus for massive printing has required high speed printing, and from the viewpoint of image fixing or the like, a solvent in ink is evaporated by using a dryer after printing.

In such an aqueous ink jet recording apparatus, a method in which a near infrared absorber having near infrared absorbing ability is added to the ink, and after printing, the ink is dried by near infrared irradiation so as to be fixed has been proposed. When the ink printed on a recording medium is irradiated with a near infrared ray, the solvent in the ink is rapidly evaporated so as to be prevented from being permeated and diffused on the recording medium, and thereby the image quality is improved.

SUMMARY

An object of the present invention is to provide an aqueous ink for ink jet recording, an aqueous ink set for ink jet recording, an ink jet recording method in which the ink and the ink set are used, and an ink jet recording apparatus, in which storage stability of an ink containing specific compound is enhanced and image deterioration at the time of recording an ink jet is suppressed as compared with a case where ink pH is out of a range of 6.5 to 8.5.

According to an aspect of the invention, an aqueous ink for ink jet recording includes:
water;
a water-soluble organic solvent;
a coloring material; and
a specific compound having a structure expressed by the following General Formula (I),
wherein ink pH is in a range of 6.5 to 8.5.

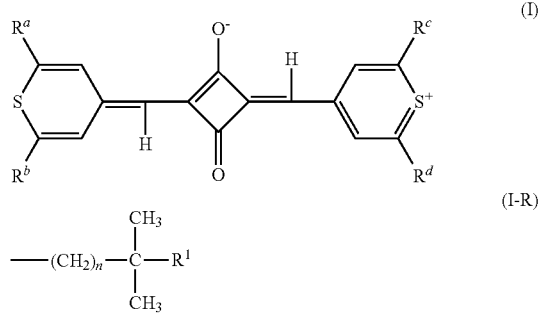

In General Formula (I), $R^a$, $R^b$, $R^c$, and $R^d$ each independently represent a structure expressed by General Formula (I-R) or an alkyl group having 1 to 6 carbon atoms which is not branched.

$R^1$ represents a hydrogen atom or a methyl group, and n represents an integer in a range of 0 to 3, and the total carbon number of the structure expressed by General Formula (I-R) is equal to or less than 6.

BRIEF DESCRIPTION OF THE DRAWINGS

Exemplary embodiment(s) of the present invention will be described in detail based on the following figures, wherein.

DETAILED DESCRIPTION

Figure 1:
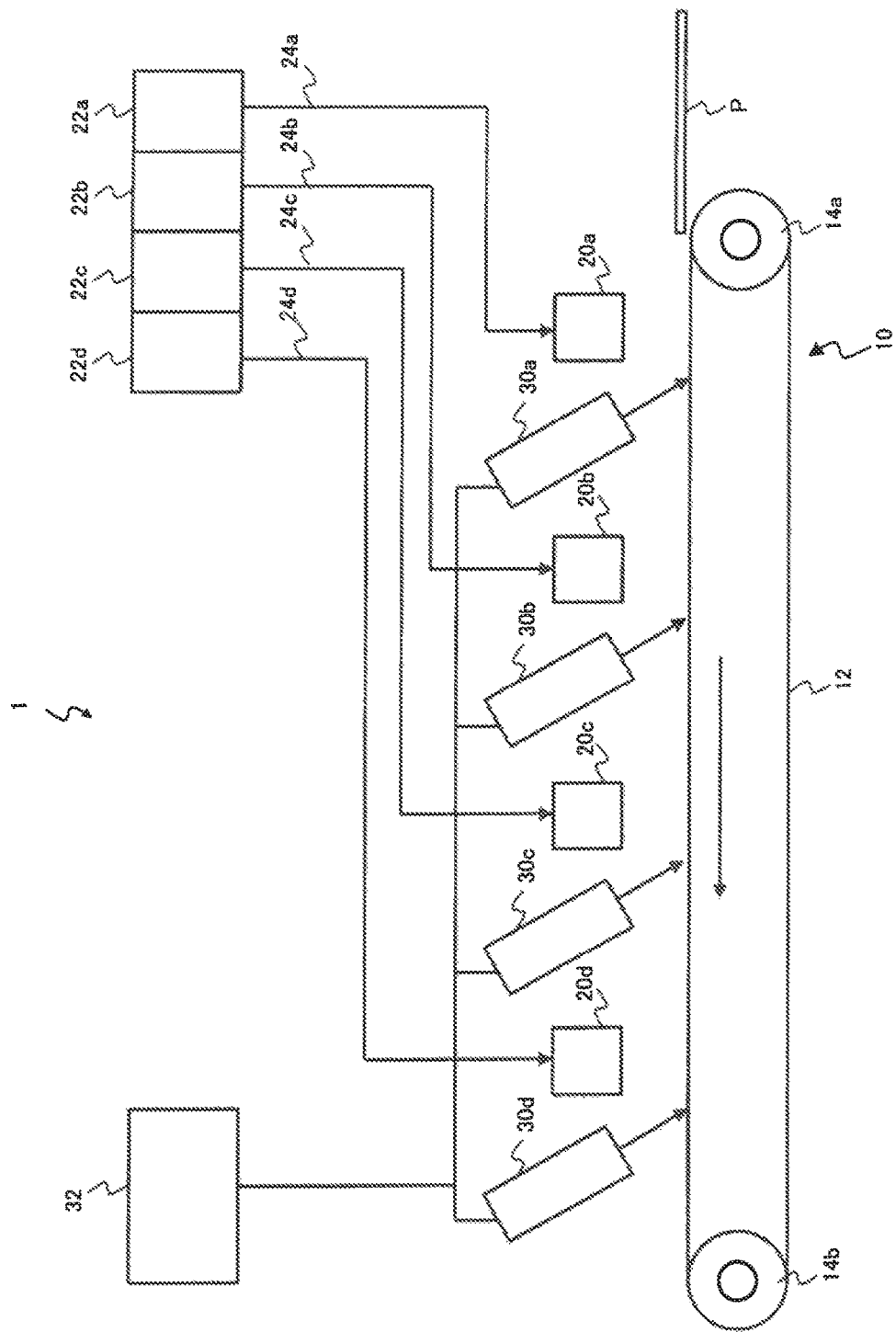
FIG. 1 is a schematic configuration diagram illustrating an example of an ink jet recording apparatus according to an embodiment of the present invention.

Embodiments of the present invention will be described below. The embodiments are merely examples for implementing the present invention, and the present invention is not limited to the embodiments.

In the aqueous ink jet recording, in a case of using a permeable recording medium, although the fixability can be secured, a solvent in ink is permeated and diffused on a recording medium before being evaporated, and thereby an image defect such as image blur may occur or an image density may be insufficient. On the other hand, in a case of using a low permeability recording medium such as a coated paper for printing, image defects such as unevenness and white lines were likely to occur due to droplet interference between ink droplets on the recording medium before the solvent in the ink is evaporated.

The present inventors have found that as an ink drying method in the aqueous ink jet recording, there is no problem to employ a method performed in such a manner that a near infrared laser installed, the ink containing a certain specific compound, which is printed on the recording medium, is irradiated with near infrared rays such so as to rapidly evaporate the solvent in the moisture of the ink, and thereby image deterioration is suppressed and an ink pH is adjusted to be in a certain range, in terms of the storage stability of ink. With this, it is possible to realize both of the storage stability of the ink containing a specific compound and the suppression of the image deterioration at the time of performing the ink jet recording. In addition, even in the case of using the low permeability recording medium, both of the suppression of the occurrence of the image defect at the time of recording and the storage stability of ink can be realized.

When after the ink is printed on the recording medium, and then is irradiated with the near infrared laser, the ink is rapidly evaporated, and in the case of using the permeable recording medium, the taxability is secured, and the occurrence of the image defects such as image blur caused by the permeation and diffusion on the recording medium before the solvent in the ink is evaporated, and the deterioration of the image density are suppressed. In the case of using the low permeability recording medium such as the coated paper for printing, the image defects such as unevenness and white lines due to the droplet interference between ink droplets, which occurs on the recording medium before the solvent in the ink is evaporated, are suppressed. Further, when the ink pH is set to be in a range of 6.5 to 8.5, deterioration of the specific compound with the lapse of time and deterioration of stability of a pigment dispersion are suppressed.

<Aqueous Ink for Ink Jet Recording>

The aqueous ink for ink jet recording according to the present embodiment contains water, a water-soluble organic solvent, a coloring material, and a specific compound having a structure expressed by the following General Formula (I), in which ink pH is in a range of 6.5 to 8.5. Hereinafter, the respective components contained in the aqueous ink for ink jet recording according to the present embodiment will be described.

(Specific Compound)

The aqueous ink for ink jet recording according to the present embodiment contains a specific compound. In the aqueous ink for ink jet recording according to the present embodiment, the specific compound having a specific structure is a squarylium compound having a structure expressed by the following General Formula

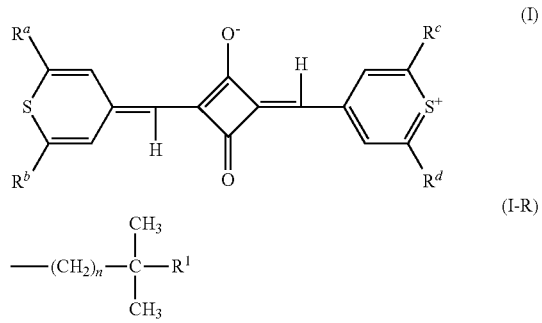

(in General Formula (I), $R^a$, $R^b$, $R^c$, and $R^d$ each independently represent a structure expressed by General Formula (I-R) or an alkyl group having 1 to 6 carbon atoms which is not branched. $R^1$ represents a hydrogen atom (H) or a methyl group, and n represents an integer in a range of 0 to 3. The total carbon number of the structure expressed by General Formula (I-R) is equal to or less than 6. In General Formula (I), it is preferable that $R^a$, $R^b$, $R^c$, and $R^d$ each independently represent a structure expressed by General Formula (I-R), $R^1$ is a methyl group, and n is 0 or 1).

The specific compound is excellent in the absorption properties of the near infrared rays, which has a center wavelength in a range of 750 nm to 950 nm, and particularly has a center wavelength in a range of 800 nm to 850 nm, is less likely to be decomposed with the lapse of time, and is also excellent in the dispersion stability in water. As the specific compound, a compound which is hard to change hues required for ink is selected.

The ink pH is set to be in a range of 6.5 to 8.5, and is set to be preferably in a range of 6.7 to 8.2. Although the specific compound has excellent properties that it is difficult to decompose with the lapse of time, in a case where the specific compound is dispersed in water, when pH of the ink to which the specific compound dispersion liquid and the specific compound are added is greater than 8.5, the specific compound is decomposed, and thus the efficiency of near infrared absorption is deteriorated, which results in lowering the evaporation rate of the ink. In the case of using the permeable recording medium, the ink is permeated and diffused on the recording medium, and in the case of using the low permeability recording medium, the droplet interference between ink droplets occurs. In addition, it is difficult to perform high speed printing.

Further, when the ink pH is lower than 6.5, the absorption spectrum of the coloring material is changed, a color tone becomes different from that in the original state, the dispersion stability of the coloring material and the specific compound in water is deteriorated, and thereby aggregates are generated with the lapse of time, and sedimentation of the aggregates occurs. Such a phenomenon is not observed in a case where the specific compound is not contained, and it is presumed that the phenomenon is influenced by an interaction between the coloring material and the specific compound.

Examples of the specific compound include specific compounds expressed by the following Structural Formulae (A) and (B). Here, the specific compound expressed by the following Structural Formula (A) has a structure in which in the above-described General Formula (I), $R^a$, $R^b$, $R^c$, and $R^d$ are expressed by General Formula (I-R), $R^1$ is a methyl group, and n is 0. The specific compound expressed by the following Structural Formula (B) has a structure in which in General Formula (I), $R^a$, $R^b$, $R^c$, and $R^d$ are expressed by General Formula (I-R), $R^1$ is a methyl group, and n is 1.

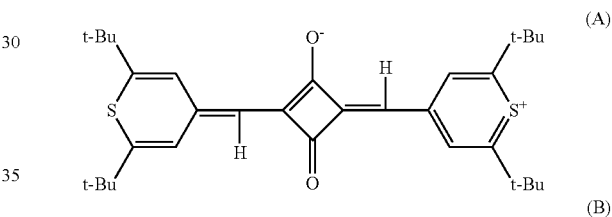

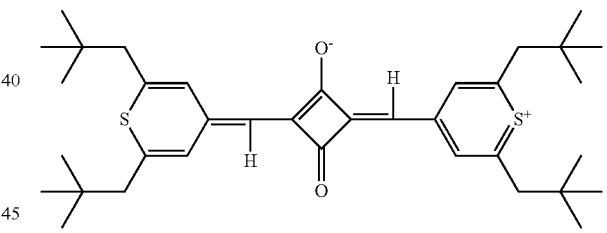

The content of the specific compound of the aqueous ink for ink jet recording according to the present embodiment may be determined depending on a desired amount of near infrared ray absorption, and an amount of ink ejected by an apparatus. The content of the specific compound is for example, in a range of 0.001% by mass to 0.5% by mass, and is further preferably in a range of 0.005% by mass to 0.3% by mass, with respect to the entire ink. When the content of the specific compound in the aqueous ink for ink jet recording is less than 0.001% by mass, the amount of the near infrared ray absorption may be insufficient in some cases, and when the content of the specific compound in the aqueous ink for ink jet recording is greater than 0.5% by mass, the color tone of ink is influenced, and thereby near infrared absorbents may be precipitated in some cases.

(Resin Dispersant)

The aqueous ink for ink jet recording according to the present embodiment further contains a resin dispersant, and the specific compound is preferably dispersed in the ink by the resin dispersant. Since the specific compound has low solubility with respect to water, or is insoluble, it is preferable to be dispersed into fine particles in water by using the resin dispersant.

Here, the expressions "dispersed" and "dispersed into fine particles" mean that the specific compound is dispersed in a state where a volume average particle diameter of a dispersion containing the specific compound in the ink is, for example, in a range of 5 nm to 150 nm, and is preferably in a range of 10 nm to 80 nm. When the volume average particle diameter of the ink is measured by using a laser diffraction type particle size distribution measuring apparatus, generally, a particle size distribution peak of the coloring material (pigment) and a particle size distribution peak of the specific compound dispersion are separated from each other, and thus it is possible to determine that the specific compound in the ink is dispersed in the above-described range of the volume average particle diameter by the resin dispersant.

As the resin dispersant, conventionally known resin dispersants can be exemplified, and examples thereof include a water-insoluble type resin, a water dispersion (self-emulsification) type resin, and a water-soluble type resin. Among them, from the viewpoint of manufacturability of the specific compound dispersion, the water-insoluble type resin and the water dispersion (self-emulsification) type resin are preferable, and from the viewpoint of the dispersion stability, the water dispersion (self-emulsification) type resin is particularly preferable. When the resin dispersant is the water-soluble type resin, the specific compound may be less likely to be dispersed and emulsified in the ink.

The resin dispersant of the water dispersion (self-emulsification) type resin is preferably at least one selected from the followings (a) to (g):

(a) polyurethane resin,
(b) polyester resin,
(c) polyamide resin,
(d) polyurea resin,
(e) polycarbonate resin,
(f) vinyl polymer which contains a constitutional unit (repeating unit) expressed by the following General Formula (II) and a constitutional unit derived from alkyl (meth)acrylate, and has an acid value in a range of 6 mgKOH/g to 100 mgKOH/g,

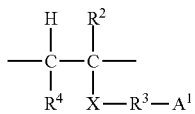

(II)

(in General Formula (II), $R^2$ represents a hydrogen atom (H), a methyl group, or —X—$R^3$-$A^1$, $R^4$ represents a hydrogen atom or —X—$R^3$-$A^1$, X represents —C(=O)—, —C(=O)O—, —C(=O)NH—, —OC(=O)—, phenylene, a divalent group of a heterocyclic ring, or a single bond, $R^3$ represents a divalent linking group or a single bond, $A^1$ represents —$SO_3H$, —COON, or —$OPO_3H_2$. In the repeating unit expressed by General Formula (II), in a case where two or more —X—$R^3$-$A^1$ are present in the same unit, X, $R^3$, or $A^1$ may be the same or different from each-other. In addition, a plurality of units having different structures may be present in the same molecule), and (g) polymer which contains constitutional unit having at least one carboxy group as a hydrophilic constitutional unit, and a constitutional unit derived from alkyl (meth)acrylate, and which has an acid value in a range of 15 mgKOH/g to 150 mgKOH/g.

Examples of the constitutional unit expressed by the above-described. General Formula (II) in the (f) vinyl polymer include an acrylic acid ($R^2$=$R^4$=H, X=$R^3$=single bond, and $A^1$=—COOH), a methacrylic acid ($R^2$=—$CH_3$, $R^4$=H, X=$R^3$=single bond, and $A^1$=—COOH), acrylic acid-2-carboxyethyl (β-carboxyethyl acrylate) ($R^2$=$R^4$=H, X=—C(=O)O—, $R^3$=—$CH_2CH_2$—, and $A^1$=—COOH), and a styrene carboxylic acid ($R^2$=$R^4$=H, X=phenylene, $R^3$=single bond, and $A^1$=—COOH), a 2-acrylamide-2-methyl propanesulfonic acid ($R^2$=$R^4$=H, X=—C(=O)NH—, $R^3$=—C(—$CH_3)_2$—$CH_2$—, and $A^1$=—$SO_3H$), and sodium styrene sulfonate ($R^2$=$R^4$=H, X=phenylene, $R^3$=single bond, and $A^1$=—$SO_3H$ (or —$SO_3Na$)), phosphoric acid mono 2-(meth)acryloylethyl ($R^2$=$CH_3$, $R^4$=H, X=—C(=O)O—, $R^3$=—$CH_2CH_2$—, and $A^1$=—$OPO_3H_2$), an itaconic acid ($R^2$=—COOH[X=$R^3$=single bond, and $A^1$=—COOH], $R^4$=H, X=single bond, $R^3$=—$CH_2$—, and $A^1$=—COOH), and a maleic acid ($R^2$=H, $R^4$=—COOH[X=$R^3$=single bond, and $A^1$=—COOH], X=$R^3$=single bond, and $A^1$=—COOH). In the constitutional unit expressed by the above-described General Formula (II), it is preferable that the number of —X—$R^3$-$A^1$ is one.

Examples of the constitutional unit derived from alkyl (meth)acrylate (note that, "alkyl (meth)acrylate" means "alkyl acrylate" or "alkyl methacrylate") in the (f) vinyl polymer include methyl (meth)acrylate, ethyl (meth)acrylate, butyl (meth)acrylate, isobutyl (meth)acrylate, methoxyethyl (meth)acrylate, phenoxyethyl (meth)acrylate, benzyl (meth)acrylate, methoxytriethylene glycol (meth)acrylate, and ethoxytriethylene glycol (meth)acrylate.

Examples of the divalent linking group in the (f) vinyl polymer include an alkylene group having 1 to 5 carbon atoms such as a methylene group, an ethylene group, a propylene group, and a 1,1-dimethylethylene group.

Examples of the divalent group of the heterocyclic ring in the (f) vinyl polymer include a divalent group of pyridine and a divalent group of morpholine.

The acid value of the (f) vinyl polymer is in a range of 6 mgKOH/g to 100 mgKOH/g, is preferably in a range of 10 mgKOH/g to 100 mgKOH/g, and is further preferably in a range of 10 mgKOH/g to 90 mgKOH/g.

Examples of the constitutional unit having at least one carboxy group as the above-described hydrophilic constitutional unit in the (g) polymer include an acrylic acid and a methacrylic acid.

The acid value of the (g) polymer is in a range of 15 mgKOH/g to 150 mgKOH/g, is preferably in a range of 20 mgKOH/g to 130 mgKOH/g, and is further preferably in a range of 30 mgKOH/g to 100 mgKOH/g.

From the viewpoint of the compatibility and the dispersion stability of the specific compound, the resin dispersant is further preferably the (a) polyurethane resin, the (b) polyester resin, and the (f) vinyl polymer, and is still further preferably the (f) vinyl polymer and the (b) polyester resin. The resin dispersant may be used alone, or two or more types thereof may be used in combination.

The acid value of each of the (a) polyurethane and the (b) polyester resin is preferably in a range of 5 mgKOH/g to 150 mgKOH/g, and is further preferably in a range of 10 mgKOH/g to 120 mgKOH/g from the viewpoint of the emulsifiability of resin and the dispersibility of the specific compound.

The weight average molecular weight of the resin dispersant is, for example, in a range of 3,000 to 200,000, is further preferably in a range of 5,000 to 150,000, and is still further preferably in a range of 10,000 to 100,000. When the weight average molecular weight of the resin dispersant is equal to or greater than 3,000, the amount of the water soluble components is effectively suppressed, and when the weight average molecular weight is equal to or less than 200,000, the dispersion stability of the specific compound can be improved.

When the acid value of the resin dispersant is less than the lower limit, the specific compound is difficult to be dispersed in the ink, on the other hand, when the acid value of the resin dispersant is greater than the upper limit, the resin dispersant becomes water-soluble and the specific compound may be difficult to be dispersed and emulsified in the ink in some cases.

The specific examples of the (a) polyurethane resin, the (b) polyester resin, the (c) polyamide resin, the (d) polyurea resin, and the (e) polycarbonate resin which are the resin dispersant are as follows.

PA-1: 4,4'-diphenylmethane diisocyanate/hexamethylene diisocyanate/tetraethylene glycol/ethylene glycol/2,2-bis (hydroxymethyl) propionic acid (40/10/20/20/10 (Molar ratio, the same shall apply hereinafter))

PA-2: 4,4'-diphenylmethane diisocyanate/hexamethylene diisocyanate/butanediol/ethylene glycol/2,2-bis(hydroxymethyl) propionic acid (40/10/20/20/10)

PA-3: 1,5-naphthylene diisocyanate/butanediol/2,2'-bis (4-hydroxyphenyl) propane/polypropylene glycol (Mw=400)/2,2-bis(hydroxymethyl) propionic acid (50/20/5/10/15)

PA-4: 1,5-naphthylene diisocyanate/hexamethylene diisocyanate/2,2-bis(hydroxymethyl) butanoic acid/polybutylene oxide(Mw=500) (35/15/25/25)

PA-5: isophorone diisocyanate/diethylene glycol/neopentyl glycol/2,2-bis(hydroxymethyl) propionic acid (50/20/20/10)

PA-6: toluene diisocyanate/2,2-bis(hydroxymethyl) butanoic acid/polyethylene glycol (Mw2 1000)/cyclohexane dimethanol (50/10/10/30)

PA-7: toluene diisocyanate/ethylene glycol/1,4-butanediol/2,4-di(2-hydroxy) ethyloxycarbonyl benzene sulfonic acid (50/15/32/3)

PA-8: isophorone diisocyanate/diethylene glycol/neopentyl glycol/2,4-di(2-hydroxy) ethyloxycarbonyl benzene sulfonic acid (50/20/25/5)

PA-9: diphenylmethane diisocyanate/hexamethylene diisocyanate/tetraethylene glycol/butanediol/2,4-di(2-hydroxy) ethyloxycarbonyl benzene sulfonic acid (40/10/10/33/7)

PA-10: diphenylmethane diisocyanate/hexamethylene diisocyanate/butanediol/ethylene glycol/2,2-bis(hydroxymethyl) butanoic acid/2,4-di(2-hydroxy) ethyloxycarbonyl benzene sulfonic acid (40/10/20/15/10/5)

PA-11: terephthalic acid/isophthalic acid/cyclohexane dimethanol/1,4-butanediol/ethylene glycol (25/25/25/15/10)

PA-12: terephthalic acid/isophthalic acid/2,2'-bis(4-hydroxyphenyl) propane/tetraethylene glycol/ethylene glycol (30/20/20/15/15)

PA-13: terephthalic acid/isophthalic acid/cyclohexane dimethanol/neopentyl glycol/diethylene glycol (20/30/25/15/10)

PA-14: terephthalic acid/isophthalic acid/4,4'-benzene dimethanol/diethylene glycol/neopentyl glycol (25/25/25/15/10)

PA-15: terephthalic acid isophthalic acid/5-sulfoisophthalic acid/ethylene glycol/neopentyl glycol (24/24/2/25/25)

PA-16: terephthalic acid/isophthalic acid/5-sulfoisophthalic acid/cyclohexane dimethanol/1,4-butanediol/ ethylene glycol (22/22/6/25/15/10)

PA-17: isophthalic acid/5-sulfoisophthalic acid/cyclohexane dimethanol/ethylene glycol (40/10/40/10)

PA-18: cyclohexane dicarboxylic acid isophthalic acid/2, 4-di(2-hydroxy) ethyloxycarbonyl benzene sulfonic acid/ cyclohexane dimethanol/ethylene glycol (30/20/5/25/20)

PA-19: 12-aminododecanoic acid (100)

PA-20: reactant of poly(12-aminododecanoic acid) and maleic anhydride

PA-21: 11-aminoundecanoic acid/7-aminoheptanoic acid (50/50)

PA-22: tetramethylene diamine/adipic acid (50/50)

PA-23: hexamethylene diamine/sebacic acid (50/50)

PA-24: N,N-dimethyl ethylene diamine/adipic acid/cyclohexane dicarboxylic acid (50/20/30)

PA-25: toluene diisocyanate/hexamethylene diamine/2,2-bis(hydroxymethyl) propionic acid(50/40/10)

PA-26: isophorone diisocyanate/poly(oxytetramethylene) glycol: number average molecular weight of 2,000/neopentyl glycol/dimethylol propionic acid (50/13.4/28.4/12.2)

PA-27: isophorone diisocyanate/polypropylene glycol: number average molecular weight 1,000/neopentyl glycoli-dimethylol propionic acid (50/20/15/15)

PA-28: isophorone diisocyanate/poly(oxytetramethylene) glycol: number average molecular weight of 2,000/triethylene glycol/2,4-di(2-hydroxy) ethyloxycarbonyl benzene sulfonic acid (50/20/18/12)

PA-29: isophorone diisocyanate/poly(oxytetramethylene) glycol (Mn2000)/neopentyl glycol/2,2-bis(hydroxymethyl) propionic acid (50/9.5/6.2/34.3)

Specific examples of the (f) vinyl polymer which is the resin dispersant will be described below.

PV-01: phenoxyethyl acrylate/methyl methacrylate/ acrylic acid/acrylic acid-2-carboxyethyl copolymer (50/44/1/5)

PV-02: phenoxyethyl acrylate/benzyl methacrylate/isobutyl methacrylate/styrene carboxylic acid copolymer (30/35/25/10)

PV-03: phenoxyethyl methacrylate/isobutyl methacrylate/ 2-acrylamide-2-methyl propanesulfonic acid copolymer (50/44/6)

PV-04: styrene/butyl acrylate/ethyl methacrylate/acrylic acid-2-carboxyethyl copolymer (30/15/49/6)

PV-05: styrene/butyl acrylate/ethyl methacrylate/sodium styrene sulfonate copolymer (30/20/44/6)

PV-06: styrene/phenoxyethyl acrylate/methyl methacrylate/acrylic acid-2-carboxyethyl copolymer (10150/35/5)

PV-07: benzyl acrylate/methyl methacrylate/acrylic acid-2-carboxyethyl copolymer (55/40/5)

PV-08 phenoxyethyl methacrylate/benzyl acrylate/styrene carboxylic acid copolymer (45/47/8)

PV-09: styrene/phenoxyethyl acrylate/butyl methacrylate/ acrylic acid-2-carboxyethyl copolymer (5/48/40/7)

PV-10: benzyl methacrylate/phenoxyethyl methacrylate/ methyl methacrylate/phosphoric acid mono 2-(meth)acryloylethyl copolymer (30/30/30/10)

PV-11: benzyl acrylate/methyl methacrylate/butyl acrylate/2-acrylamide-2-methyl propanesulfonic acid copolymer (12/50/30/8)

PV-12: styrene/ethyl methacrylate/acrylic acid-2-carboxyethyl copolymer (30/60/10)

PV-13: styrene/phenoxyethyl methacrylate./butyl acrylate/acrylic acid-2-carboxyethyl copolymer (15/76/5/4)

PV-14: methyl methacrylate/phenoxyethyl methacrylate/benzyl acrylate/acrylic acid-2-carboxyethyl copolymer (50/30/15/5)

PV-15: methyl methacrylate/butyl methacrylate/2-acrylamide-2-methyl propanesulfonic acid copolymer (56/40/4)

PV-16: benzyl acrylate/acrylic acid-2-carboxyethyl copolymer (90/10)

PV-17: methyl methacrylate/methoxyethyl acrylate/benzyl methacrylate/itaconic acid copolymer (44/15/35/6)

PV-18: ethyl methacrylate/styrene/maleic acid copolymer (46/50/4)

PV-19: methyl methacrylate/benzyl methacrylate/methoxypolyethylene glycol methacrylate (n=23)/2-acrylamide-2-methyl propanesulfonic acid copolymer (74/15/5/6)

PV-20: benzyl methacrylate/ethoxypolyethylene glycol methacrylate/phosphoric acid mono 2-(meth)acryloylethyl copolymer (65/30/5)

PV-21: methyl methacrylate/butyl acrylate/acrylic acid-2-carboxyethyl copolymer (75/19/6)

PV-22: phenoxyethyl acrylate/benzyl methacrylate/isobutyl methacrylate/styrene sulfonic acid copolymer (30/35/29/6)

PV-23: benzyl methacrylate/ethyl methacrylate/β-carboxyethyl acrylate copolymer (60/25/15)

PV-24: phenoxyethyl methacrylate/ethyl methacrylate/methacrylic acid copolymer (50/38/12)

PV-25: benzyl methacrylate/ethyl methacrylate/β-carboxyethyl acrylate copolymer (60/18/22)

Specific examples of the (g) polymer which is the resin dispersant will be described below.

P-1: n-butyl acrylate/acrylic acid copolymer (80/20)

P-2: methyl methacrylate/isobutyl methacrylate/acrylic acid copolymer (52/28/20)

P-3: sec-butyl acrylate/acrylic acid copolymer (85/15)

P-4: n-butyl methacrylate/pentyl methacrylate/methacrylic acid copolymer (38/38/24)

P-5: isobutyl acrylate/glycidyl methacrylate/acrylic acid copolymer (75/15/10)

P-6: isopropyl acrylate/acrylic, acid copolymer (90/10)

P-7: butyl methacrylate/2-hydroxyethyl methacrylate/acrylic acid copolymer (85/5/10)

P-8: n-butyl methacrylate/1H,1H,2H,2H-perfluorodecyl acrylate/acrylic acid copolymer (75/20/5)

P-9: methyl methacrylate/n-butyl acrylate/acrylic acid copolymer (50/45/5)

P-10: methacrylic acid ester/acrylic acid copolymer (80/10/10) of isobutyl methacrylate/polyethylene glycol monomethyl ether (the repeat number of ethyleneoxy chain: 9)

P-11: styrene/ethyl methacrylate/methacrylic acid copolymer (30/62/8)

P-12: styrene/ethyl methacrylate/methacrylic acid copolymer (40/45/15) The content of the resin dispersant in the aqueous ink for ink jet recording according to the present embodiment may be determined in accordance with the dispersibility or the like of the specific compound. The content of the resin dispersant in the aqueous ink for ink jet recording is, for example, in a range of 0.1% by mass to 10% by mass, and is preferably in a range of 0.3% by mass to 7% by mass, with respect to the entire ink. When the content of the resin dispersant is less than 0.1% by mass, the specific compound may be insufficiently dispersed in some cases, on the other hand, when the content of the resin dispersant is greater than 10% by mass, clogging at a nozzle end, a roller offset, and a storage offset may be deteriorated in some cases.

(Coloring Material)

The aqueous ink for ink jet recording according to the present embodiment contains a coloring material. As the coloring material, pigments and dyes which are used in various types of ink are used, and from the viewpoints of light fastness and heat resistance, the pigments are preferable.

As the specific pigments, examples of a cyan pigment include C.I. Pigment Blue 1, C.I. Pigment Blue 2, C.I. Pigment Blue 3, C.I. Pigment Blue 4, C.I. Pigment Blue 5, C.I. Pigment Blue 6, C.I. Pigment Blue 7, C.I. Pigment Blue 10, C.I. Pigment Blue 11, C.I. Pigment Blue 12, C.I. Pigment Blue 13, C.I. Pigment Blue 14, C.I. Pigment Blue 15, C.I. Pigment Blue 15;1, C.I. Pigment Blue 15:2, C.I. Pigment Blue 15:3, C.I. Pigment Blue 15:4, C.I. Pigment Blue 15:6, C.I. Pigment Blue 16, C.I. Pigment Blue 17, C.I. Pigment Blue 23, C.I. Pigment Blue 60, C.I. Pigment Blue 65, C.I. Pigment Blue 73, C.I. Pigment Blue 83, and C.I. Pigment Blue 180; C.I. Bat Cyan 1, C.I. Bat Cyan 3, and C.I. Bat Cyan 20; and cyan pigments such as Prussian blue, cobalt blue, alkali blue lake, phthalocyanine blue, metal free phthalocyanine blue, partial chlorinated product of phthalocyanine blue, first sky blue, and indathrene blue BC.

Examples of a magenta pigment include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 13, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 39, C.I. Pigment Red 40, C.I. Pigment Red 41, C.I. Pigment Red 48, C.I. Pigment Red 49, C.I. Pigment Red 50, C.I. Pigment Red 51, C.I. Pigment Red 52, C.I. Pigment Red 53, C.I. Pigment Red 54, C.I. Pigment Red 55, C.I. Pigment Red 57, C.I. Pigment Red 58, C.I. Pigment Red 60, C.I. Pigment Red 63, C.I. Pigment Red 64, C.I. Pigment Red 68, C.I. Pigment Red 81, C.I. Pigment Red 83, C.I. Pigment Red 87, C.I. Pigment Red 88, C.I. Pigment Red 89, C.I. Pigment Red 90, C.I. Pigment Red 112, C.I. Pigment Red 114, C.I. Pigment Red 122, C.I. Pigment Red 123, C.I. Pigment Red 163, C.I. Pigment Red 184, C.I. Pigment Red 202, C.I. Pigment Red 206, C.I. Pigment Red 207, and C.I. Pigment Red 209; and. Pigment Violet 19. Also, examples thereof include magenta dyes such as C.I. Solvent Red 1, C.I. Solvent Red 3, C.I. Solvent Red 8, C.I. Solvent Red 23, C.I. Solvent Red 24, C.I. Solvent Red 25, C.I. Solvent Red 27, C.I. Solvent Red 30, C.I. Solvent Red 49, C.I. Solvent Red 81, C.I. Solvent Red 82, C.I. Solvent Red 83, C.I. Solvent Red 84, C.I. Solvent Red 100, C.I. Solvent Red 109, and C.I. Solvent Red 121; C.I. Disperse Red 9; C.I. Basic Red 1, C.I. Basic Red 2, C.I. Basic Red 9, C.I. Basic Red 12, C.I. Basic Red 13, C.I. Basic Red 14, C.I. Basic Red 15, C.I. Basic Red 17, C.I. Basic Red 18, C.I. Basic Red 22, C.I. Basic Red 23, C.I. Basic Red 24, C.I. Basic Red 27, C.I. Basic Red 29, C.I. Basic Red 32, C.I. Basic. Red 34, C.I. Basic Red 35, C.I. Basic Red 36, C.I. Basic Red 37, C.I. Basic Red 38, C.I. Basic Red 39, and C.I. Basic Red 40; and Bengara, Cadmium Red, Red Lead, Mercury Sulfide, Permanent Red 4R, Lithol Red, Pyrazolone Red, Watching Red, Calcium Salt, Lake Red D, Brilliant Carmine 6B, Eosin Lake, Rotamin Lake B, Alizarin Lake, and Brilliant Carmine 3B.

Examples of a yellow pigment include C.I. Pigment Yellow2, C.I. Pigment Yellow 3, C.I. Pigment Yellow 15, C.I. Pigment Yellow 16, C.I. Pigment Yellow 17, C.I. Pigment Yellow 74, C.I. Pigment Yellow 97, C.I. Pigment Yellow 180, C.I. Pigment Yellow 185, and C.I. Pigment Yellow 139.

Examples of a black pigment used for a black ink include a carbon pigment such as carbon black. Since the carbon pigment has high near infrared ray absorption ability, there is no need to add a specific compound in addition to the carbon pigment. In such a case, the carbon pigment is a component serving as both of the coloring material and the specific compound.

The content of the coloring material in the aqueous ink for ink jet recording according to the present embodiment may be determined in accordance with hues required for ink. The content of the coloring material is, for example, in a range of 0.5% by mass to 10% by mass, and is preferably in a range of 1% by mass to 8% by mass, with respect to the entire ink. When the content of the coloring material is less than 0.5% by mass, color development on the recording medium may be insufficient, on the other hand, when the content of the coloring material is greater than 10% by mass, the ink storage life may be shortened, or clogging may occur in a head.

(pH Regulator)

A pH regulator may be used so as to adjust the pH of the aqueous ink for ink jet recording according to the present embodiment to be in a range of 6.5 to 8.5. The pH regulator is not particularly limited as long as the pH can be adjusted to be in a range of 6.5 to 8.5, and for example, various types of pH buffers may be used. Examples of the pH buffers include a good buffer, sodium dihydrogen phosphate-disodium hydrogen phosphate, potassium dihydrogen phosphate-sodium hydroxide, and boric acid-potassium chloride-sodium hydroxide, and the good buffer is preferably used in consideration of the stability of the pH with the lapse of time and the suppression of deterioration of head members. Examples of the good buffer include ADA, PIPES, ACES, cholamine chloride, BES, TES, HEPES, acetamideglycine, tricine, glycinamide, and bicine.

(Solvent)

As a solvent in the aqueous ink for ink jet recording according to the present embodiment, water-soluble organic solvents other than water may be used. Examples of the water-soluble organic solvent include polyhydric alcohols such as ethylene glycol, diethylene glycol, triethylene glycol, tetraethylene glycol, polyethylene glycol, propylene glycol, dipropylene glycol, tripropylene glycol, 1,3-propanediol, 1,3-butanediol, 2,3-butanediol, 1,4-butanediol, 3-methyl-1,3-butanediol, 1,5-pentanediol, 3-methyl-1,5-pentanediol, 2-methyl-2,4-pentanediol, 1,2-hexanediol, 1,6-hexanediol, glycerin, 1,2,3-butanetriol, 1,2,4-butanetriol, 1,2,6-hexanetriol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monoisopropyl ether, diethylene glycol monobutyl ether, tetraethylene glycol monomethyl ether, and propylene glycol monoethyl ether; polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone,3-dimethyl imidazolidinone, and c-caprolactam; amides such as formamide, N-methyl formamide, N,N-dimethyl formamide; amines such as monoethanolamine, diethanolamine, triethanolamine, monoethylamine, diethylamine, and trimethylamine; sulfur-containing compounds such as dimethyl sulfoxide, sulfolane, and thiodiethanol; propylene carbonate; and ethylene carbonate. These can be used alone or two or more types thereof can be used in combination.

Among them, in consideration of the solubility and suppression of defects of the ejection properties due to the moisture evaporation, propylene glycol, diethylene glycol monoisopropyl ether, 1,2-hexanediol, ethylene glycol, diethylene glycol, 1,3-propanediol, diethylene glycol monobutyl ether, diethylene glycol mono-n-propyl ether, propylene glycol monomethyl ether, 2-pyrrolidone, and 2,3-butanediol are preferable.

The content of the water in the aqueous ink for ink jet recording according to the present embodiment is, for example, in a range of 40% by mass to 90% by mass with respect to the entire ink. The content of the water-soluble organic solvent in the aqueous ink for ink jet recording according to the present embodiment is, for example, in a range of range of 3% by mass to 50% by mass, and is preferably in a range of 5% by mass to 40% by mass, with respect to the entire ink, When the content of the water-soluble organic solvent is less than 3% by mass, the nozzle is likely to be dried, and thereby ejection defects of droplets may occur, and when the content of the water-soluble organic solvent is greater than 50% by mass, the viscosity of the ink is increased and thus may exceed an appropriate viscosity range.

(Other Components)

The aqueous ink for ink jet recording according to the present embodiment may contain a pigment dispersant for dispersing a pigment which is a coloring material, an emulsion, a surfactant, and other components in addition to the above-described specific compound and the coloring material. As other components, various conventionally known components can be used at a known addition ratio.

Examples of the pigment dispersant include a polymer dispersant; and an anionic surfactant, a cationic surfactant, an amphoteric surfactant, and a nonionic surfactant which will be described below. Particularly, the polymer dispersant is preferably used from the viewpoint of the pigment dispersion stability.

As the polymer dispersant, a polymer having a hydrophilic structure and a hydrophobic structure is preferably used. Examples of the polymer having a hydrophilic structure and a hydrophobic structure include a condensation polymer and an addition polymer. As the condensation polymer, conventionally known polyester-based dispersants can be exemplified. As the addition polymer, an addition polymer of a monomer having an $\alpha,\beta$-ethylenically unsaturated group can be exemplified. When a monomer having an $\alpha,\beta$-ethylenically unsaturated group which has a hydrophilic group and a monomer having the $\alpha,\beta$-ethylenically unsaturated group which has a hydrophobic group are combined so as to be copolymerized, a desired polymer dispersant can be obtained. Further, a homopolymer of the monomer having the $\alpha,\beta$-ethylenically unsaturated group which has a hydrophilic group also can be used.

Examples of the monomer having the $\alpha,\beta$-ethylenically unsaturated group which has the hydrophilic group include a monomer having a carboxyl group, a sulfonic acid group, a hydroxyl group, a phosphate group, or the like, for example, an acrylic acid, a methacrylic acid, a crotonic acid, an itaconic acid, an itaconic acid monoester, a maleic acid, a maleic acid monoester, a fumaric acid, a fumaric acid monoester, a vinyl sulfonic acid, a styrene sulfonic acid, sulfonated vinyl naphthalene, vinyl alcohol, acrylamide, methacryloxyethyl phosphate, bismethacryloxyethyl phosphate, methacryloxyethyl phenyl acid phosphate, ethylene glycol dimethacrylate, and diethylene glycol dimethacrylate.

Examples of the monomer having the α,β-ethylenically unsaturated group which has the hydrophobic group include styrene derivatives such as styrene, α-methylstyrene, and vinyl toluene, vinyl cyclohexane, vinyl naphthalene, vinyl naphthalene derivatives, acrylic acid alkyl ester, methacrylic acid alkyl ester, methacrylic acid phenyl ester, methacrylic acid cycloalkyl ester, crotonic acid alkyl ester, itaconic acid dialkyl ester, and maleic acid dialkyl ester.

Preferred examples of the copolymer as a polymer dispersant include a styrene-styrene sulfonic acid copolymer, styrene-maleic acid copolymer, a styrene-methacrylic acid copolymer, a styrene-acrylic acid copolymer, a vinyl naphthalene-maleic acid copolymer, a vinyl naphthalene-methacrylic acid copolymer, a vinyl naphthalene-acrylic acid copolymer, an acrylic acid alkyl ester-acrylic acid copolymer, a methacrylic acid alkyl ester-methacrylic acid copolymer, a styrene-methacrylic acid alkyl ester-methacrylic acid copolymer, a styrene-acrylic acid alkyl ester-acrylic acid copolymer, a styrene-methacrylic acid phenyl ester-methacrylic acid copolymer, a styrene-methacrylic acid cyclohexyl ester-methacrylic acid copolymer, or salts thereof. Further, a monomer having a polyoxyethylene group and a hydroxyl group may be copolymerized with these polymers.

Among them, the polymer dispersant selected from the group consisting of a styrene-acrylic acid copolymer, and a styrene-acrylic acid salt copolymer is preferable, a styrene-acrylic acid salt copolymer is further preferable, and a styrene-acrylic acid alkali metal salt copolymer is particularly preferable.

Such polymer dispersants may be used alone, or two or more types thereof may be used in combination. The content of the polymer dispersant is largely differentiated depending on the pigment, and thus cannot be unconditionally specified; however, it is preferably in a range of 0.1% by mass to 100% by mass with respect to the pigment.

Examples of the surfactant include an anionic surfactant, a nonionic surfactant, a cationic surfactant, and an amphoteric surfactant, the anionic surfactant and the nonionic surfactant are preferable, and the nonionic surfactant is further preferable.

As the nonionic surfactant, it is preferable to contain for example, a surfactant in which a balance between a hydrophilic group and a hydrophobic group (hydrophile-lipophile balance "HLB") is equal to or lower than 14, When the amount of the surfactant in which the HLB is equal to or lower than 14 is adjusted, or various toes of surfactants having different HLB are used, it is easy to adjust surface tension of the aqueous ink. Note that, the balance between a hydrophilic group and a hydrophobic group (hydrophile-lipophile balance "HLB") is defined by the following expression (Griffin method).

$$HLB=20\times(\text{total formula weight of hydrophilic part molecular weight})$$

Examples of such a surfactant include at least one type of surfactant selected from the group consisting of an ethylene oxide adduct of acetylene glycol, and polyether modified silicone. The ethylene oxide adduct of acetylene glycol is a compound having an —O—$(CH_2CH_2O)$n-H structure (note that, for example, n represents an integer in a range of 1 to 30) in which at least one hydroxyl group of acetylene glycol is added to the ethylene oxide.

Example of commercially available product of the ethylene oxide adduct of acetylene glycol (note that, the numerical values in parentheses indicate the catalog value of HLB) include OLFINE E1004 (in a range of 7 to 9), OLFINE E1010 (in a range of 13 to 14), OLFINE EXP.4001 (in a range of 8 to 11), OLFINE EXP.4123 (in a range of 11 to 14), and OLFINE EXP.4300 (in a range of 10 to 13); SURFYNOL 104H(4), SURFYNOL 420(4), and SURFYNOL 440 (8); and DYNOL 604(8) (which are prepared by Nissin Chemical Co., Ltd).

The polyether modified silicone is, for example, a compound in which a polyether group is bonded to a silicone chain (a polysiloxane main chain) in a graft form, or in a block form. Examples of the polyether group include a polyoxyethylene group and a polyoxypropylene group. The polyether group may be a polyoxyalkylene group to which an oxyethylene group and an oxypropylene group are added in the block form or added in a random manner.

Example of commercially available product of the polyether modified silicone (note that, the numerical values in parentheses indicate the catalog value of HLB) include SILFACE SAG002 (12), SILFACE SAG503A (11), and SILFACE SAG005 (7) (which are prepared by Nissin Chemical Co., Ltd).

In addition, other nonionic surfactants in addition to the ethylene oxide adduct of acetylene glycol, and the polyether modified silicone, may be used. Examples of other nonionic surfactants include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, sucrose fatty acid ester, polyoxyethylene alkylamine, polyoxyethylene fatty acid amide, alkyl alkanol amide, a polyethylene glycol polypropylene glycol block copolymer, and acetylene glycol.

Among them, polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylolamide, polyethylene glycol polypropylene glycol block copolymer, and acetylene glycol are preferable.

Examples of other nonionic surfactants further include a silicone-based surfactant such as a polysiloxane oxyethylene adduct; a fluorine-based surfactant such as perfluoroalkyl carboxylate, perfluoroalkyl sulfonate, and oxyethylene perfluoroalkyl ether; and a biosurfactant such as spiculisporic acid, rhamnolipid, and lysolecithin Further, examples of the anionic surfactant include alkyl benzene sulfonate, alkyl phenyl sulfonate, alkyl naphthalene sulfonate, higher fatty acid salt, sulfuric acid ester salt of higher fatty acid ester, sulfuric acid ester salt of higher fatty acid ester, sulfuric acid ester salt of higher alcohol ether and sulfonate, higher alkyl sulfosuccinate, polyoxyethylene alkyl ether carboxylate, polyoxyethylene alkyl ether sulfate, alkyl phosphate, and polyoxyethylene alkyl ether phosphate.

Among them, as the anionic surfactant, dodecyl benzene sulfonate, isopropyl naphthalene sulfonate, monobutyl phenyl phenol monosulfonate, monobutyl biphenyl sulfonate monobutyl biphenyl sulfonate, and dibutyl phenyl phenol disulfonate are preferable.

The surfactants may be used alone or two or more types thereof may be used in combination.

Examples of the emulsion include polyurethane emulsion.
<Aqueous Ink Set for Ink Jet Recording>

The aqueous ink set for ink jet recording according to the present embodiment is formed of a black ink containing carbon black as a coloring material, and one or more types of color inks which are the above-described aqueous ink for ink jet recording, and of which the coloring materials thereof are chromatic color materials. The term "chromatic color" means a color having hue and saturation besides lightness, that is, a color other than an achromatic color having only lightness without hue of white, black, gray, or the like and saturation. An aqueous ink set for ink jet recording is formed of a black ink containing carbon black as a coloring material, and one or more of a cyan ink, a magenta ink, and a yellow ink which are the aqueous ink for ink jet recording.

<Ink Jet Recording Apparatus and Ink Jet Recording Method>

An ink jet recording apparatus and an ink jet recording method according to the present embodiment is an ink jet recording apparatus and an ink jet recording method to which the above-described aqueous ink for ink jet recording or the above-described aqueous ink set for ink jet recording are applied.

The ink jet recording apparatus according to the present embodiment is an apparatus including a recording head which ejects the above-described aqueous ink for ink jet recording or the above-described aqueous ink set for ink jet recording and applied the ink onto the recording medium, and a near infrared laser light emitting device which irradiates the ink applied onto the recording medium with near infrared laser having a center wavelength in a range of 750 nm to 950 nm.

The ink jet recording method according to the present embodiment is a method of performing recording in such a manner that the aqueous ink for ink jet recording or the aqueous ink set for ink jet recording is ejected from the recording head so as to be applied onto the recording medium, and then the ink on the recording medium is irradiated with the near infrared laser having the center wavelength in a range of 750 nm to 950 nm so as to dry the ink.

The ink jet recording apparatus and the ink jet recording method according to the present embodiment are preferably used as an ink jet recording apparatus and an ink jet recording method for high speed printing.

As the ink jet recording apparatus including the above-described aqueous ink for ink jet recording and the aqueous ink for an ink jet recording, and the ink jet recording method, the following configurations and methods in (1) to (3) can be exemplified.

(1) Configuration and method in which recording is performed by repeatedly performing a process of applying ink onto a recording medium for each color ink, and then irradiating the ink applied on the recording medium with near infrared laser having the center wavelength in a range of 750 nm to 950 nm For example, a black ink is printed on the recording medium by a head for black, and then the ink on the recording medium is irradiated with the near infrared laser so as to dry the black ink. After that, the printing and the laser irradiation are repeatedly performed such as (i) cyan ink printing and laser irradiation to dry the cyan ink, (ii) magenta ink printing and laser irradiation to dry the magenta ink, and (iii) yellow ink printing and laser irradation dry the yellow ink in this order. The printing, order of the ink is not limited as described above, and a position of a laser irradiation apparatus in the transporting of the recording medium is not limited as well.

(2) Configuration and method in which recording is performed by repeatedly performing a process of applying ink onto a recording medium for each color ink, and then irradiating the ink applied on the recording medium with near infrared laser having the center wavelength in a range of 750 urn to 950 nm, and after the ink to be recorded last is applied to the recording medium, the recording medium is heated without being irradiated with the near infrared laser so as to dry the ink For example, the printing order is set as (i) black ink printing and laser irradiation, ii) cyan ink printing and laser irradiation, (iii) magenta ink printing and laser irradiation, (iv) yellow ink printing, and (v) after the yellow ink is applied onto the recording medium, the recording medium is heated without being irradiated with the near infrared laser so as to dry the ink. For example, the heating may be performed by drying the entire surface of the recording medium by using a heating device such as a heater dryer. The printing order of the ink is not limited as described above, and a position of a laser irradiation apparatus and the heating device in the transporting of the recording medium is not limited as well.

In the case of (2), the ink to be applied last may not contain a specific compound. For example, in a case where the specific compound influences the coloring of yellow, when a configuration in which the ink to be printed last is set as a yellow ink, and the yellow ink does not contain the specific compound., the influence of specific compounds on the coloring of yellow can be avoided.

(3) Configuration and method in which after applying the ink for all colors onto the recording medium, the ink on the recording medium is irradiated with the near infrared laser having a center wavelength in a range of 750 nm to 950 nm For example, the printing order is set as (i) black ink printing, (ii) cyan ink printing, (iii) magenta ink printing, (iv) yellow ink printing, and (v) laser irradiation in this order. The printing order of the ink is not limited as described above.

Hereinafter, the ink jet recording apparatus according to the present embodiment will be described with reference to the drawings. FIG. 1 is a schematic configuration diagram illustrating an example of an ink jet recording apparatus according to an embodiment of the present invention. The ink jet recording apparatus 1 according to the present embodiment as illustrated in FIG. 1 is in accordance with the configuration and method described in the above (1). The ink jet recording apparatus 1 is provided with a transporting means 10 for transporting a recording medium P, four ink jet recording heads 20*a*, 20*b*, 20*c*, and 20*d* which eject a plurality of colors of ink onto the recording medium P for each color and apply the ink onto the recording medium, and four laser irradiation means 30*a*, 30*b*, 30*c*, and 30*d*, as a near infrared laser light emitting device, which irradiate the ink for each color ejected on the recording medium P with the neat infrared laser having a center wavelength in a range of 750 nm to 950 nm.

The transporting means 10 is obtained by extending an endless belt 12 by rollers 14*a* and 14*b*. The belt 12 extended by the rollers 14*a* and 14*b* is configured such that at least areas (ink ejection areas) which face nozzle surfaces of the ink jet recording heads 20*a*, 20*b*, 20*c*, and 20*d*, and irradiation areas of the near infrared laser by the laser irradiation means 30*a*, 30*b*, 30*c*, and 30*d* are substantially horizontal. Further, the belt 12 has a width larger than the maximum width of the recording medium P which is a target of the ink jet recording apparatus 1.

A motor for driving a belt (not shown) is connected to one or both of the rollers 14*a* and 14*b*, and the belt 12 rotates and moves in an arrow direction indicated in FIG. 1 by a driving force of the motor. In accordance with the rotation and movement of such a belt 12, a recording medium P such as a recording sheet supplied on the belt 12 is transported from one side (right side) to the other side (left side) in FIG. 1.

The four ink jet recording heads 20a, 20b, 20c, and 20d are disposed along the downstream side from the upstream side in the transporting direction of the recording medium P, and are respectively connected to ink tanks 22a, 22b, 22c, and 22d which store a plurality of colors of ink for each color via pipes 24a, 24b, 24c, and 24d. The ink for each color supplied from each of the ink tanks 22a, 22b, 22c, and 22d is sequentially ejected to the recording medium P transported by the transporting means 10 from each of the ink jet recording heads 20a, 20b, 20c, and 20d.

The ink jet recording heads 20a, 20b, 20c, and 20d are configured to include, for example, a head 20a for ejecting a black ink from the upstream side in the transporting direction of the recording medium P, a head 20b for ejecting a cyan ink, a head 20c for supplying a magenta ink, and a head 20d for ejecting a yellow ink. The combination of inks ejected from the respective ink jet recording heads 20a, 20b, 20c, and 20d is not limited to the above-described configuration as long as it has a configuration of ejecting a plurality of colors of ink for each color. For example, a configuration in which a head for ejecting ink having another hue other than the above-described four colors is further included (that is, a configuration in which five or more heads are present) may be employed, or a configuration in which the hues of ink to be ejected or the order (ejecting order) are different from that in the above-described configuration may be employed.

A line-type ink jet recording heads having a width which is the same as or larger than the width of the recording medium P that is a target of the ink jet recording apparatus 1 is applied to each of the ink jet recording heads 20a, 20b, 20c, and 20d. Note that, a scan-type ink jet recording head in the related art also may be applied. In addition, as a method of ejecting the ink from the respective ink jet recording heads 20a, 20b, 20c, and 20d, a conventionally known method such as a piezoelectric element drive type or a heating element drive type is applied.

The four laser irradiation means 30a, 30b, 30c, and 30d are disposed on the downstream side in the transporting direction of the recording medium P with respect to the respective ink jet recording heads 20a, 20b, 20c, and 20d. The laser irradiation means 30a, 30b, 30c, and 30d have a function of applying the near infrared laser, and irradiation energy, irradiation timing, and oscillation wavelength of the near infrared laser is controlled by a laser control section 32.

The laser irradiation means 30a, 30b, 30c, and 30d are not particularly limited as long as it is the near infrared laser having a center wavelength in a range of 750 nm to 950 nm, or is preferably the near infrared laser having an oscillation wavelength in a range of 800 nm to 850 nm. Examples of the laser irradiation means include near infrared laser such as semiconductor laser, solid laser, gas laser, and dye laser, and if a condensing optical system is installed, a high power LED may be used. Further, more specifically, the semiconductor array laser having an oscillation wavelength of 900 nm, the semiconductor array laser having an oscillation wavelength of 810 nm, the semiconductor laser array having an oscillation wavelength of 840 nm, the semiconductor array laser having an oscillation wavelength of 940 nm, and the titanium sapphire laser having an oscillation wavelength 800 nm are applied, The irradiation conditions of the near infrared laser by the laser irradiation means 30a, 30b, 30c, and 30d are not particularly limited as long as the ink can be dried; however, it is preferable that the ink ejected onto the recording medium P is irradiated with energy as uniformly as possible.

For example, the near infrared laser may be linearly arranged in the direction substantially perpendicular to the transporting direction of the recording medium P, or may be a scanning type depending on the transporting speed of the recording medium P and the output of the laser. In addition, as the irradiation conditions of the near infrared laser, the following can be exemplified. In other words, in a case of linearly performing the beam irradiation on the recording medium P, the linear irradiation area may be determined by a width in the transporting direction and a width in the direction substantially perpendicular to the transporting direction of the recording medium P (that is, a length and a width of the recording medium P). Specifically, the width in the direction substantially perpendicular to the transporting direction of the recording medium P (the width of the recording medium P) is a paper width or a width of an area to which the ink is ejected, and the width (the length of the recording medium P) in the transporting direction is set depending on a transporting speed and a desired irradiation time (width= transporting speed× irradiation time). In addition, the irradiation energy by the near infrared laser may be determined in accordance with the ink ejection amount or the like. For example, when the typical ink ejection amount is assumed to be in a range of 1 $g/cm^2$ to 30 $g/cm^2$, the irradiation energy may be adjusted to be in a range of 0.3 $J/cm^2$ to 10 $J/cm^2$ by the energy absorbed by the ink, and when the absorption rate of the ink with respect to the laser light is assumed to be A, the irradiation energy is a range of 0.3/A ($J/cm^2$) to 10/A ($J/cm^2$). Note that, the absorption rate A is changed depending on the order of ink ejection (dry), but is preferably selected from the range of 10% to 100%.

Further, from the viewpoint that the occurrence of the permeation and diffusion of the ink before the solvent in the ink is evaporated and the occurrence of the droplet interference between ink droplets on the recording medium P are suppressed, it is preferable that immediately after the ink is landed on the recording medium P, the ink is irradiated with the near infrared laser by the laser irradiation means 30a, 30b, 30c, and 30d. For example, it is preferable that the ink is irradiated with infrared laser within 100 milliseconds after the start of ejection of ink. More specifically, since the ink is changed to be easily permeated into the recording medium P depending on the type of the recording medium P, for example, if the recording medium P is a low permeability recording medium such as a coated paper for printing, the ink is preferably irradiated with the near infrared laser within 100 milliseconds after the start of ejection of the ink, and if the recording medium P is a permeable recording medium such as a rough paper, the ink is preferably irradiated with the near infrared laser within several milliseconds after the start of ejection of the ink. For this reason, the laser irradiation means 30a, 30b, 30c, and 30d and the ink jet recording heads 20a, 20b, 20c, and 20d are preferably disposed to be adjacent to each other. In addition, the laser irradiation means and the ink jet recording head may be integrally formed for each color unlike the example of the ink jet recording apparatus 1, and a laser irradiation portion and an ink landed portion may be disposed to be adjacent to each other by using an optical system such as mirror.

Subsequently, an image forming process by the ink jet recording apparatus 1 will be described. In the ink jet recording apparatus 1, first, the recording medium P is supplied onto the belt 12 being rotably driven by a supply unit (not shown). Then, ink droplets of the ink (for example, black ink) are ejected on the supplied recording medium P by ink jet recording head 20a based on predetermined image information so as to be landed on the recording medium P. In addition, the ink landed on the recording medium P is immediately irradiated with the near infrared laser by a laser irradiation means 30a. With this, the ink is rapidly dried, and thus the occurrence of the permeation and diffusion of ink and the occurrence of the droplet interference between ink droplets on the recording medium P are suppressed.

As described above, the ink ejection by the ink jet recording heads 20b, 20c, and 20d, and the irradiation of the near infrared laser by the laser irradiation means 30b, 30c, and 30d are performed respectively, and an image is formed by the ink for each color (for example, a cyan ink, a magenta ink, and a yellow ink). Even in this case, the ink is rapidly dried, and thus the occurrence of the permeation and diffusion of ink and the occurrence of the droplet interference between ink droplets on the recording medium P are suppressed. With such a configuration, the image forming is performed by the ink jet recording apparatus 1.

Figure 2:
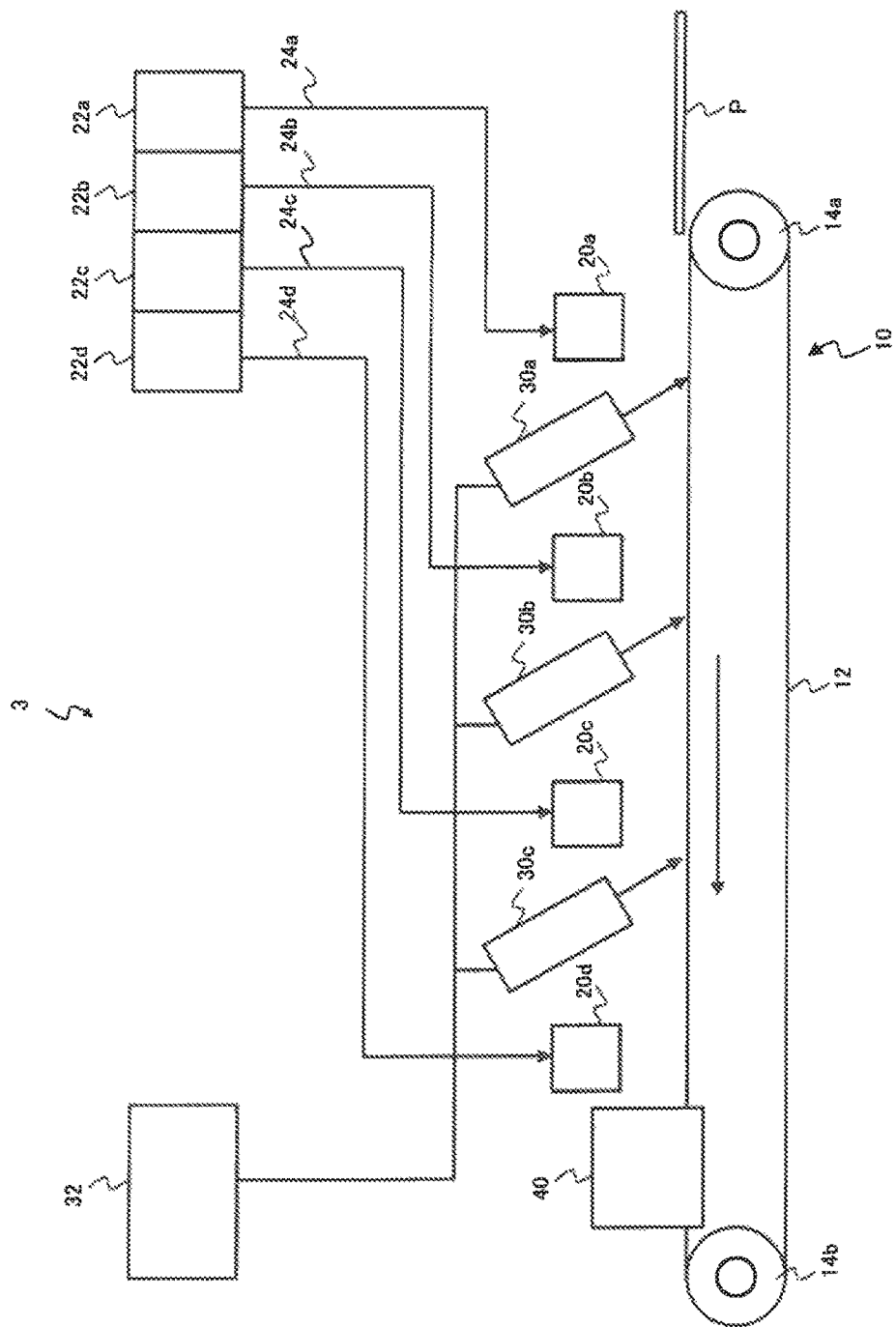
FIG. 2 is a schematic configuration diagram illustrating another example of an ink jet recording apparatus according to an embodiment of the present invention.

FIG. 2 is a schematic configuration diagram illustrating another example of the ink jet recording apparatus according to the present embodiment. An ink jet recording apparatus 3 according to the present embodiment as illustrated in FIG. 2 is in accordance with the configuration and method described in the above (2). The ink jet recording apparatus 3 is provided with a transporting means 10 for transporting a recording medium P, four ink jet recording heads 20a, 20b, 20c, and 20d which eject a plurality of colors of ink onto the recording medium P for each color and apply the ink onto the recording medium, three laser irradiation means 30a, 30b, and 30c, as a near infrared laser light emitting device, which irradiate the ink for each color ejected on the recording medium P with the near infrared laser having a center wavelength in a range of 750 nm to 950 nm, and a heating device 40 for heating the recording medium P.

The transporting means 10 is obtained by extending an endless belt 12 by rollers 14a and 14b. The belt 12 extended by the rollers 14a and 14b is configured such that at least areas (ink ejection areas) which face nozzle surfaces of the ink jet recording heads 20a, 20b, 20c, and 20d, and irradiation areas of the near infrared laser by the laser irradiation means 30a, 30b, and 30c are substantially horizontal. Further, the belt 12 has a width larger than the maximum width of the recording medium P which is a target of the ink jet recording apparatus 3.

A motor for driving a belt (not shown) is connected to one or both of the rollers 14a and 14b, and the belt 12 rotates and moves in an arrow direction indicated in FIG. 2 by a driving force of the motor. In accordance with the rotation and movement of such a belt 12, a recording medium P such as a recording sheet supplied on the belt 12 is transported from one side (right side) to the other side (left side) in FIG. 2.

The four ink jet recording heads 20a, 20b, 20c, and 20d are disposed along the downstream side from the upstream side in the transporting direction of the recording medium P, and are respectively connected to ink tanks 22a, 22b, 22c, and 22d which store a plurality of colors of ink for each color via pipes 24a, 24b, 24c, and 24d. The ink for each color supplied from each of the ink tanks 22a, 22b, 22c, and 22d is sequentially ejected to the recording medium P transported by the transporting means 10 from each of the ink jet recording heads 20a, 20b, 20c, and 20d, The ink jet recording heads 20a, 20b, 20c, and 20d are configured to include, for example, a head 20a for ejecting a black ink from the upstream side in the transporting direction of the recording medium P, a head 20b for ejecting a cyan ink, a head 20c for supplying a magenta ink, and a head 20d for ejecting a yellow ink. The combination of inks ejected from the respective ink jet recording heads 20a, 20b, 20c, and 20d is not limited to the above-described configuration as long as it has a configuration of ejecting a plurality of colors of ink for each color. For example, a configuration in which a head for ejecting ink having another hue other than the above-described four colors is further included (that is, a configuration in which five or more heads are present) may be employed, or a configuration in which the hues of ink to be ejected or the order (ejecting order) are different from that in the above-described configuration lay be employed.

The three laser irradiation means 30a, 30b, and 30c are disposed on the downstream, side in the transporting direction of the recording medium P with respect to the respective ink jet recording heads 20a, 20b, and 20c. The laser irradiation means 30a, 30b, and 30c have a function of applying the near infrared laser, and irradiation energy, irradiation timing, and oscillation wavelength of the near infrared laser is controlled by a laser control section 32. Further, with respect to the ink jet recording head 20d, the heating device 40 is disposed on the downstream side in the transporting direction of the recording medium P.

An image forming process by the ink jet recording apparatus 3 will be described. In the ink jet recording apparatus 3, first, the recording medium P is supplied onto the belt 12 being rotably driven by a supply unit (not shown). Then, ink droplets of the ink (for example, black ink) are ejected on the supplied recording medium P by ink jet recording head 20a based on predetermined image information so as to be landed on the recording medium P. In addition, the ink landed on the recording, medium P is immediately irradiated with the near infrared laser by a laser irradiation means 30a. With this, the ink is rapidly dried, and thus the occurrence of the permeation and diffusion of ink and the occurrence of the droplet interference between ink droplets on the recording medium P are suppressed.

As described above, the ink ejection by the ink jet recording heads 20b and 20c, and the irradiation of the near infrared laser by the laser irradiation means 30b and 30c are performed respectively, and an image is formed by the ink for each color (for example, a cyan ink and a magenta ink). Even in this case, the ink is rapidly dried, and thus the occurrence of the permeation and diffusion of ink and the occurrence of the droplet interference between ink droplets on the recording medium P are suppressed. Subsequently, after the ink is ejected by the ink jet recording head 20d, the recording medium. P is transported to the heating device 40, the entire surface of the recording medium P is dried, and thereby an image is formed by the ink (for example, a yellow ink). In this way, the ink to be recorded last (for example, the yellow ink) is applied to the recording medium P, and then the recording medium P is heated so as to dry the ink without irradiation of the near infrared laser. With such a configuration, the image forming is performed by the ink jet recording apparatus 3.

The heating device 40 is not particularly limited as long as it is possible to dry the entire surface of the recording medium P, and examples thereof include a far infrared heater dryer, a drum heater, a carbon heater, and a halogen heater.

According to the configuration and the method of the ink jet recording apparatus 3, for example, in a case where the specific compound influences the coloring of yellow, when the ink to be printed last is assumed to be a yellow ink and the yellow ink does not contain a specific compound, the influence on the coloring of yellow by the specific compound can be avoided.

Figure 3:
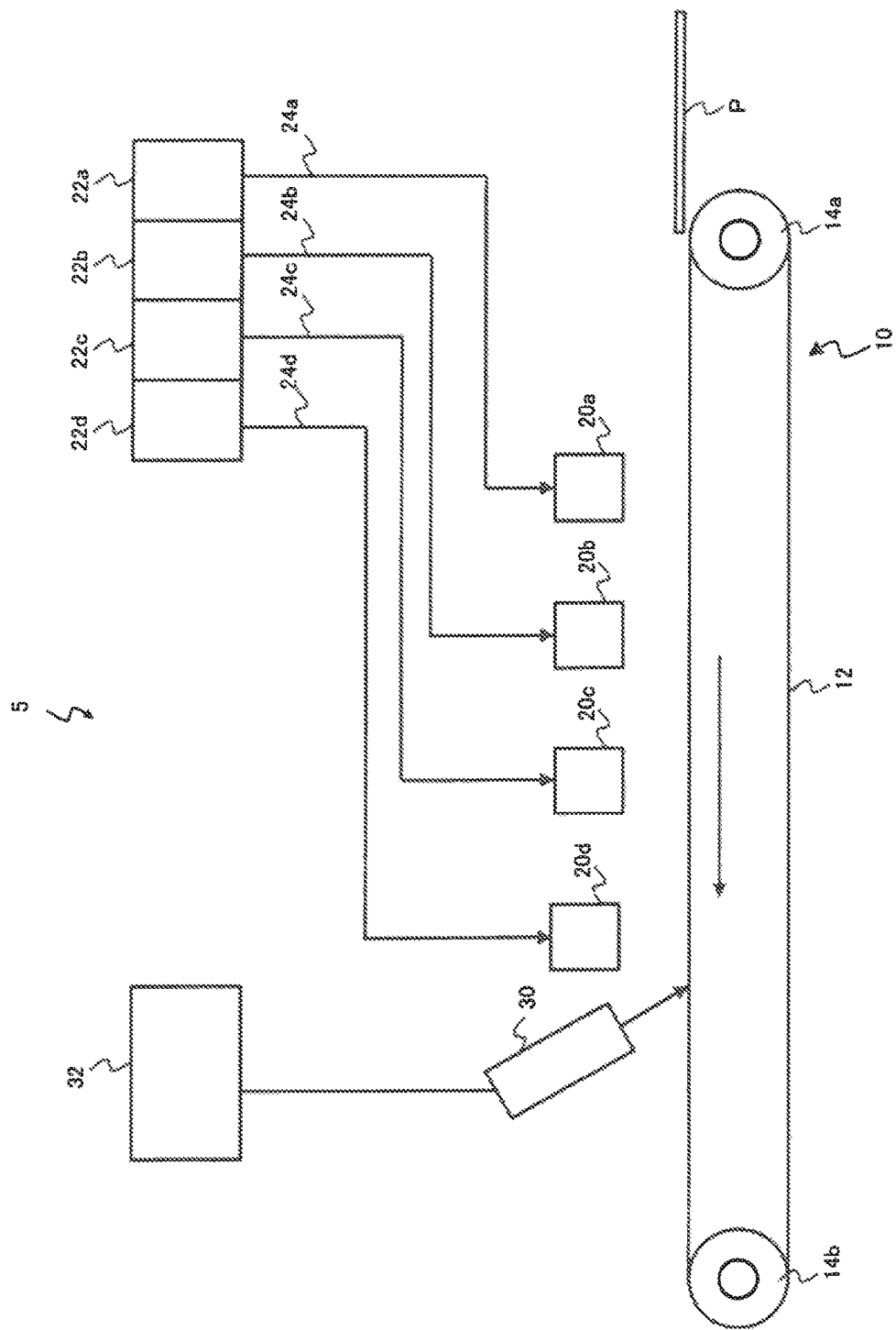
FIG. 3 is a schematic configuration diagram illustrating still another example of an ink jet recording apparatus according to an embodiment of the present invention.

FIG. 3 is a schematic configuration diagram illustrating still another example of the ink jet recording apparatus according to the present embodiment. An ink jet recording apparatus 5 according to the present embodiment as illustrated in FIG. 3 is in accordance with the configuration and method described in the above (3). The ink jet recording apparatus 5 is provided with a transporting means 10 for transporting a recording medium P, four ink jet recording heads 20a, 20b, 20c, and 20d which eject a plurality of colors of ink onto the recording medium P for each color and apply the ink onto the recording medium, one laser irradiation means 30 as a near infrared laser light emitting device which irradiates the ink ejected on the recording medium P with the near infrared laser having a center wavelength in a range of 750 nm to 950 nm.

The transporting means 10 is obtained by extending an endless belt 12 by rollers 14a and 14b. The belt 12 extended by the rollers 14a and 14b is configured such that at least areas (ink ejection areas) which face nozzle surfaces of the ink jet recording heads 20a, 20b, 20c, and 20d, and irradiation areas of the near infrared laser by the laser irradiation means 30 are substantially horizontal. Further, the belt 12 has a width larger than the maximum width of the recording medium P which is a target of the ink jet recording apparatus 5.

A motor for driving a belt (not shown) is connected to one or both of the rollers 14a and 14b, and the belt 12 rotates and moves in an arrow direction indicated in FIG. 3 by a driving force of the motor. In accordance with the rotation and movement of such a belt 12, a recording medium P such as a recording sheet supplied on the belt 12 is transported from one side (right side) to the other side (left side) in FIG. 3.

The four ink jet recording heads 20a, 20b, 20c, and 20d are disposed along the downstream side from the upstream side in the transporting direction of the recording medium P, and are respectively connected to ink tanks 22a, 22b, 22c, and 22d which store a plurality of colors of ink for each color via pipes 24a, 24b, 24c, and 24d. The ink for each color supplied from each of the ink tanks 22a, 22b, 22c, and 22d is sequentially ejected to the recording medium P transported by the transporting means 10 from each of the ink jet recording heads 20a, 20b, 20c, and 20d.

The ink jet recording heads 20a, 20b, 20c, and 20d are configured to include, for example, a head 20a for ejecting a black ink from the upstream side in the transporting direction of the recording medium P, a head 20b for ejecting a cyan ink, a head 20c for supplying a magenta ink, and a head 20d for ejecting a yellow ink. The combination of inks ejected from the respective ink jet recording heads 20a, 20b, 20c, and 20d is not limited to the above-described configuration as long as it has a combination of ejecting a plurality of colors of ink for each color. For example, a configuration in which a head for ejecting ink having another hue other than the above-described four colors is further included (that is, a configuration in which five or more heads are present) may be employed, or a configuration in which the hues of ink to be ejected or the order (ejecting order) are different from that in the above-described configuration may be employed.

The laser irradiation means 30 is disposed on the downstream side in the transporting direction of the recording medium P with respect to the ink jet recording head 20d. The laser irradiation means 30 has a function of applying the near infrared laser, and irradiation energy, irradiation timing, and oscillation wavelength of the near infrared laser is controlled by a laser control section 32.

An image forming process by the ink jet recording apparatus 5 will be described. In the ink jet recording apparatus 5, first, the recording medium. P is supplied onto the belt 12 being rotably driven by a supply unit (not shown). Then, ink droplets of the ink (for example, black ink) are ejected on the supplied recording medium P by ink jet recording head 20a based on predetermined image information so as to be landed on the recording medium P.

As described above, the ink ejection by each of the ink jet recording heads 20b, 20e, and 20d is performed, and an image is formed by the ink for each color (for example, a cyan ink, a magenta ink, and a yellow ink). In addition, the ink landed on the recording medium P is irradiated with the near infrared laser by the laser irradiation means 30. With this, the ink is rapidly dried, and thus the occurrence of the permeation and diffusion of ink and the occurrence of the droplet interference between ink droplets on the recording medium P are suppressed. With such a configuration, the image forming is performed by the ink jet recording apparatus 5.

Among the above-described ink jet recording apparatuses 1, 3, and 5, in other words, among the configuration and method in the above (1), (2), and (3), from the viewpoint that the occurrence of the permeation and diffusion of ink and the occurrence of the droplet interference between ink droplets on the recording medium P are suppressed, the ink jet recording apparatus 1, that is, the configuration and method described in the above (1), and the ink jet recording apparatus 3, that is, the configuration and method described in the above (2) are preferable, and the ink jet recording apparatus 1, that is, the configuration and method described in the above (1) is most preferable.

EXAMPLES

Hereinafter, the present invention will be more specifically described with reference to examples and comparative examples; however, the present invention is not limited to the following examples.

[Specific Compound (A)]

A specific compound (A) (in the above-described General Formula (I), a compound having a structure in which $R^a$, $R^b$, $R^c$, and $R^d$ are expressed by General Formula (I-R), $R^1$ is a methyl group, and n is 0) was synthesized in accordance with the following scheme.

A reaction container was set by installing a Dean-Stark trap, a reflux condenser, a stirring seal, and a stir bar in a three-necked flask. 2,2,8,8-Tetramethyl-3,6-nonadiyn-5-ol and cyclohexane was put into the reaction container. Manganese oxide (IV) powder was added, and stirred by using a three one motor, and heated to reflux. The water generated during the reaction was removed by azeotropic distillation. Through thin layer chromatography, it was confirmed that 2,2,8,8-tetramethyl-3,6-nonadiyn-5-ol did not remain. The reaction mixture was cooled down, and then was filtrated under the reduced pressure so as to obtain a yellow filtrate (F1). The solid obtained by filtration was transferred to another container, ethyl acetate was added to the contain d ultrasonic dispersion and filtration were repeatedly performed four times so as to obtain an ethyl acetate extract (F2). The ethyl acetate extract (F2) and the filtrate (F1) were mixed with each other, and then the mixture was concentrated by using a rotary evaporator and a vacuum pump so as to obtain an orange colored liquid. The orange colored liquid was distilled under the reduced pressure so as to obtain a pale yellow liquid (intermediate 1).

A reaction container was set by installing a thermometer and a dropping funnel in the three-necked flask. Sodium monosulfide n-hydrate was added to ethanol, and the mixture was stirred at room temperature (20° C.) until being dissolved, and then was cooled with ice water. When the internal temperature reached 5° C., a mixed solution of the intermediate 1 and ethanol was slowly added dropwise. The liquid changed from yellow to orange by the dropwise addition. Since the internal temperature rises due to heat generation, the dropwise addition was performed within the range of the internal temperature 5° C. to 7° C. while adjusting the amount of dropping. After that, an ice water bath was removed and the liquid was stirred while spontaneously raising the temperature of the liquid at room temperature (20° C.). Water was added to the reaction solution, and ethanol was removed by using a rotary evaporator. Then, salt was added to the solution until it saturated, and the solution was separated with ethyl acetate so as to recover an organic phase. The organic phase was washed twice with saturated ammonium chloride and dried with magnesium sulfate. After drying, it was concentrated under reduced pressure so as to recover a brown liquid. The brown liquid was distilled under reduced pressure. Although the distillation started at 200° C., the initial distillation component was not included, and thus it was assumed that the main distillation was started when the amount of steam increased. The yellow liquid (intermediate 2) was distilled.

A stir bar and the intermediate 2 were put into the three-necked flask, a nitrogen inlet tube and a reflux condenser were installed therein, and the atmosphere of the inside of the flask was substituted with nitrogen. Under a nitrogen atmosphere, anhydrous tetrahydrofuran was added by using a syringe, and a 1 M tetrahydrofuran (THF) solution of methyl magnesium bromide was added dropwise by using the syringe while being stirred at room temperature (20°). After completion of the dropwise addition, the reaction solution was heated, stirred, and refluxed. After the reaction solution was cooled down under the nitrogen atmosphere, a solution obtained by dissolving ammonium bromide in water was added dropwise while cooling the reaction solution with an ice water bath. The reaction mixture was further stirred at room temperature (20° C.), then n-hexane was added, and the mixture was dried with sodium sulfate. After drying the mixture, an n-hexane/THF solution was extracted by using a syringe, and an inorganic layer was washed with ethyl acetate so as to obtain an extract liquid. The n-hexane/THF solution and the extracted liquid from the inorganic layer were mixed with each other, and the mixture was concentrated under reduced pressure and then vacuum dried so as to obtain an intermediate 3.

Under the nitrogen atmosphere, the intermediate 3 and a squaric acid were dispersed in a mixed solvent of cyclohexane and isobutanol, pyridine was added, and the mixture was heated under reflux. After that, isobutanol was added and the reaction mixture was further heated to reflux. The Water generated during the reaction was refloved by azeotropic distillation. The reaction mixture was cool down and filtered under the reduced pressure so as to remove an insoluble matter. The filtrate was concentrated by using a rotary evaporator. Methanol was added to the residue, then heated up to 40° C., and then was cooled to −10° C. Crystals were obtained by filtration, and the obtained crystals were vacuum dried so as to obtain a specific compound (A).

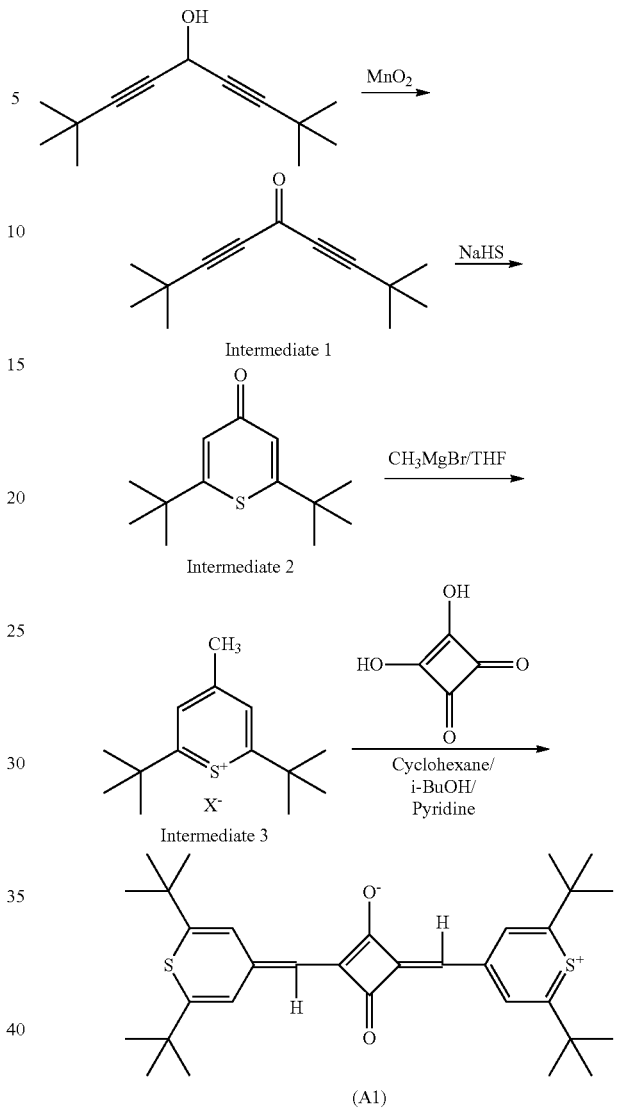

Example 1

[Cyan Ink 1]

Coloring material (pigment) Pigment Blue 15:4: 4% by mass

Styrene-methacrylic acid ester-methacrylic acid Na salt copolymer (pigment dispersant): 0.4% by mass Near infrared absorbing aqueous dispersion liquid (hereinafter, the content of the specific compound of the following structure (A): 0.24% by mass, a resin dispersant PV-12 (the weight average molecular weight: 32000, and acid value: 34 mgKOH/g): 4.8% by mass): 21% by mass Propylene glycol: 10% by mass Diethylene glycol monoisopropyl ether: 5% by mass 1,2-hexanediol: 1% by mass OLFINE E1010 (surfactant): 0.5% by mass OLFINE E1004 (surfactant): 0.5% by mass pH buffer (BES/NaOH aqueous solution): 2% by mass Pure water: 55.6% by mass

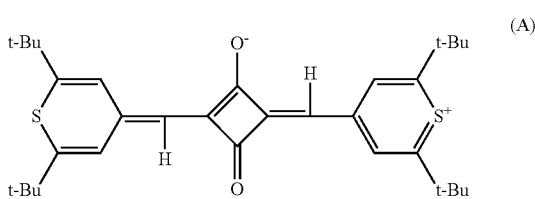 [SMILES: CC(C)(C)C1=CC(=CC2=C([O-])/C(=C/c3cc(C(C)(C)C)[s+]c(C(C)(C)C)c3)C2=O)C=C(C(C)(C)C)S1]

The above-described components were mixed, and then the mixture was filtrated by using 5 μm of filter so as to obtain a cyan ink 1. The ink pH was 7.7.

[Magenta Ink 1]

Coloring material (pigment) Pigment Red 122: 6% by mass

Styrene-methacrylic acid ester-methacrylic acid Na salt copolymer (pigment dispersant): 0.6% by mass Near infrared absorbing aqueous dispersion liquid (hereinafter, the content of the specific compound of the above-described structure (A): 0.24% by mass, a resin dispersant PV-12: 4.8% by mass): 21% by mass Propylene glycol: 10% by mass
Diethylene glycol monoisopropyl ether: 5% by mass
1,2-hexanediol: 1% by mass
OLFINE E1010: 0.6% by mass
OLFINE E1004: 0.4% by mass
pH buffer (BES/NaOH aqueous solution): 2% by mass
Pure water: 53.4% by mass The above-described components were mixed, and then the mixture was filtrated by using 5 μm of filter so as to obtain a magenta ink 1. The ink pH was 7.4.

[Yellow Ink 1]

Coloring material (pigment) Pigment Yellow 74: 4% by mass

Styrene-methacrylic acid ester-methacrylic acid Na salt copolymer (pigment dispersant): 0.4% by mass Near infrared absorbing aqueous dispersion liquid (hereinafter, the content of the specific compound of the above-described structure (A): 0.24% by mass, a resin dispersant PV-12: 4.8% by mass): 21% by mass Propylene glycol: 12% by mass
Diethylene glycol monoisopropyl ether: 5% by mass
1,2-hexanediol: 1% by mass
OLFINE E1010: 0.6% by mass
OLFINE E1004: 0.4% by mass
pH buffer (BES/NaOH aqueous solution): 2% by mass
Pure water: 53.6% by mass The above-described components were mixed, and then the mixture was filtrated by using 5 μm of filter so as to obtain a yellow ink 1. The ink pH was 8.0.

[Black Ink 1]

Coloring material (pigment) Carbon. Black: 5% by mass
Styrene-acrylic acid ester-acrylic acid Na salt copolymer (pigment dispersant): 0.5% by mass
Propylene glycol: 15% by mass
Diethylene glycol monoisopropyl ether: 4% by mass
1,2-hexanediol: 1.5% by mass
Polyacrylate emulsion (solid content 25%): 3% by mass
OLFINE E1010: 0.6% by mass
OLFINE E1004: 0.4% by mass
pH buffer (BES/NaOH aqueous solution): 2% by mass
Pure water: 70% by mass The above-described components were mixed, and then the mixture was filtrated by using 5 μm of filter so as to obtain a black ink 1.

[Evaluation]

(Nonuniformity of Image)

The recording was performed on OK top coat+(manufactured by Oji Paper Co., Ltd.) which is coated paper for printing as a low permeability recording medium by using an ink set containing the cyan ink 1, the magenta ink 1, the yellow ink 1, and the black ink 1 in the ink jet recording apparatus (peak wavelength of near infrared laser: 808 nm) illustrated in FIG. 1. A monochrome and secondary color solid patches were visually evaluated according to the following criteria. The result of Example 1 was A. The results are indicated in Table 1.

A: Entire solid patches look uniform

B: Although some graininess deterioration is seen, there is no apparent streak unevenness C: white lines can be visually recognized (Ink Storage Stability)

The above-described ink was kept in a sealed condition at 50° C. for one month. The ink pH, the viscosity, the surface tension, the volume average particle diameter, the number of coarse particles having a size of greater than 0.5 μm, the peak wavelength of spectral spectrum, and the absorbance of the pigment and the specific compound after the storage were compared with those before the storage, and evaluation was performed according to the following criteria. The change rate of all items was less than 10%, which was evaluated as A. The results are indicated in Table 1.

A: All items have change rate of equal to or less than 10%

B: Change rate of one item is greater than 10% and equal to or less than 20%, and change rate of remaining items is equal to or less than 10%

C: Change rate of two or more items is greater than 10%, or change rate of one item is greater than 20%

In addition, the ink pH was measured at 23° C. by using a pH measuring device (MPC227, manufactured by Meftler Toledo International Inc). The viscosity was measured at 23° C. at a shear rate of 750 s-1 by using a viscosity measuring device (TV-20, manufactured by Toki Sangyo Co., Ltd). The surface tension was measured at 23° C. by using a surface tension measuring device (Wilhelmy type CBVP, manufactured by Kyowa Interface Science Co., Ltd). The volume average particle diameter was measured at 23° C. by using a particle size distribution measuring device (Nanotrac UPA, manufactured by Nikkiso Co., Ltd.). The number of coarse particles having a size of greater than 0.5 μm was measured at 23° C. by using a particle counting type particle size distribution meter (AccuSizer 780 APS, manufactured by PSS). The peak wavelength of spectral spectrum and the absorbance thereof were measured at 23° C. by using a spectrophotometer (V-560, manufactured by JASCO Corporation). In addition, the acid value of the resin dispersant was measured was measured by a neutralization titration method defined in HS K 0070: 1992.

Comparative Example 1

The evaluation was performed by using the same method that used in Example 1 except that instead of the ink used in Example 1, ink containing the pH buffer of sodium bicarbonate-sodium hydroxide, and having pH adjusted to be 9.5 was used. The evaluation result of the nonuniformity of image was C, and in the evaluation of the ink storage stability, the change rate of the volume average particle diameter and the spectral spectrum was larger than 10%, and thus the evaluation result was C. It is considered that the near infrared absorption efficiency by the specific compound was deteriorated, and thus white lines were generated due to the droplet interference between ink droplets on the recording medium before the solvent in the ink was evaporated. In addition, it is considered that crystallization of the specific compound occurred, and thus the volume average particle diameter became large.

Comparative Example 2

The evaluation was performed by using the same method that used in Example 1 except that instead of the ink used in Example 1, ink containing the pH buffer of sodium bicarbonate-sodium hydroxide, and having pH adjusted to be 5.8 was used. The evaluation result of the nonuniformity of image was A; whereas in the ink storage stability, the change rate of the viscosity, the number of coarse particles having a size of greater than 0.5 µm, and the spectral spectrum was greater than 20%, and thus the evaluation result was C. It is considered that the absorption spectrum of the coloring material was changed, and the dispersion stability of the coloring material and the specific compound in water was deteriorated, and thus aggregates were formed with the lapse of time.

Comparative Example 3

The evaluation was performed by using the same method that used in Example 1 except that instead of the ink used in Example 1, ink containing the pH buffer of sodium bicarbonate-sodium hydroxide, and having pH adjusted to be 8.6 was used. The evaluation result of the nonuniformity of image was C, and in the evaluation of the ink storage stability, the change rate of the spectral spectrum was greater than 10%, and thus the evaluation result was B.

Comparative Example 4

The evaluation was performed by using the same method that used in Example 1 except that instead of the ink used in Example 1, ink containing the pH buffer of sodium bicarbonate-sodium hydroxide, and having pH adjusted to be 6.4 was used. The evaluation result of the nonuniformity of image was A; whereas in the ink storage stability, the change rate of the viscosity, the number of coarse particles having a size of greater than 0.5 µm, and the spectral spectrum was greater 20%, and thus the evaluation result was C.

Example 2

[Cyan ink 2]
Coloring material (pigment) Pigment Blue 15:4: 4% by mass
Styrene-methacrylic acid ester-methacrylic acid Na salt copolymer (pigment dispersant): 0.4% by mass
Near infrared absorbing aqueous dispersion liquid (hereinafter, the content of the specific compound of the above-described structure (A): 0.24% by mass, a resin dispersant PV-05 (the weight average molecular weight; 20,000, and acid value: 16 mgKOH/g): 4.8% by mass): 21% by mass
Propylene glycol: 10% by mass
Propylene glycol monopropyl ether: 4% by mass
1,2-hexanediol: 0.5% by mass
OLFINE E1010: 0.6% by mass
OLFINE E1004: 0.4% by mass
pH buffer (BES/NaOH aqueous solution): 1.7% by mass
Pure water: 55.6% by mass
The above-described components were mixed, and then the mixture was filtrated by using 5 µm of filter so as to obtain a cyan ink 2. The ink pH was 7.1. The cyan ink 2 was replaced with the cyan ink 1 of Example 1, and the same evaluation as that in Example 1 was performed. Evaluation results were all A.

Example 3

Cyan Ink 3

Coloring material (pigment) Pigment Blue 15:4: 4% by mass
Styrene-methacrylic acid ester-methacrylic acid Na salt copolymer (pigment dispersant): 0.4% by mass
Near infrared absorbing aqueous dispersion liquid (hereinafter, the content of the specific compound of the above-described structure (A): 0.24% by mass, a resin dispersant PV-15 (the weight average molecular weight: 27000, and acid value: 11 mgKOH/g): 4.8% by mass): 21% by mass
Propylene glycol: 10% by mass
Propylene glycol monobutyl ether: 3% by mass 1,2-hexanediol: 0.5% by mass
OLFINE E1010: 0.6% by mass
OLFINE E1004: 0.4% by mass
pH buffer (BES/NaOH aqueous solution): 1.5% by mass
Pure water: 55.6% by mass
The above-described components were mixed, and then the mixture was filtrated by using 5 µm of filter so as to obtain a cyan ink 3. The ink pH was 6.8. The cyan ink 3 was replaced with the cyan ink 1 of Example 1, and the same evaluation as that in Example 1 was performed. Evaluation results were all A.

[Specific Compound (B)]
A specific compound (B) was synthesized through the same process as that in the synthesis of the specific compound (A) except that 2,10-dimethyl-4,7-undecadine-6-ol was used instead of 2,2,8,8-tetramethyl-3,6-nonadiyn-5-ol.

Example 4

Cyan Ink 4

Coloring material (pigment) Pigment Blue 15:4: 4% by mass
Styrene-methacrylic acid ester-methacrylic acid Na salt copolymer (pigment dispersant): 0.4% by mass
Near infrared absorbing aqueous dispersion liquid (hereinafter, the content of the specific compound of the following structure (B): 0.24% by mass, a resin dispersant PV-PV-12: 4.8% by mass): 21% by mass
Propylene glycol: 10% by mass
Propylene glycol monobutyl ether: 3% by mass
1,2-hexanediol: 0.7% by mass
OLFINE E1010: 0.5% by mass
OLFINE E1004: 0.5% by mass
pH buffer (BES/NaOH aqueous solution): 2% by mass
Pure water: 57.6% by mass

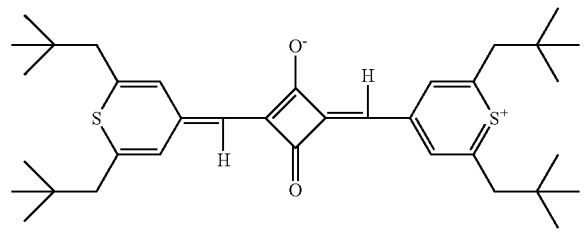

(B)

The above-described components were mixed, and then the mixture was filtrated by using 5 μm of filter so as to obtain a cyan ink 4. The ink pH was 7.7. The cyan ink 4 was replaced with the cyan ink 1 of Example 1, and the same evaluation as that in Example 1 was performed. The evaluation results of the nonuniformity of image and the ink storage stability were A.

Example 5

Cyan Ink 5

Coloring material (pigment) Pigment Blue 15:4: 4% by mass
Styrene-methacrylic acid ester-methacrylic acid Na salt copolymer (pigment dispersant): 0.4% by mass
Near infrared absorbing aqueous dispersion liquid (hereinafter, the content of the specific compound of the above-described structure (A): 0.24% by mass, a resin dispersant PV-11 (the weight average molecular weight: 40,000, and acid value: 21 mgKOH/g): 4.8% by mass): 21% by mass
Propylene glycol: 10% by mass
Dipropylene glycol monoisopropyl ether: 4% by mass
1,2-hexanediol: 0.5% by mass
OLFINE E1010: 0.6% by mass
OLFINE E1004: 0.4% by mass
pH buffer (BES/NaOH aqueous solution): 2.5% by mass
Pure water: 56.6% by mass The above-described components were mixed, and then the mixture was filtrated by using 5 μm of filter so as to obtain a cyan ink 5. The ink pH was 8.4. The cyan ink 5 was replaced with the cyan ink 1 of Example 1, and the same evaluation as that in Example 1 was performed. The evaluation result of the nonuniformity of image was A, and regarding the evaluation of the ink storage stability, when comparing with the ink storage stability before the storage, the change rate of pH was 15%; whereas the change rate of other properties was B.

Example 6

The evaluation was performed by using the same method that used in Example 1 except that instead of the ink used in Example 1, ink containing the pH buffer of Bicine-sodium hydroxide, and having pH adjusted to be 8.5 was used. The evaluation result of the nonuniformity of image was A, and the change rate of all items was less than 10%, which was evaluated as A.

Example 7

The evaluation was performed by using the same method that used in Example 1 except that instead of the ink used in Example 1, ink containing the pH buffer of ADA-sodium hydroxide, and having pH adjusted to be 6.5 was used. The evaluation result of the nonuniformity of image was A, and the change rate of all items was less than 10%, which was evaluated as A.

Example 8

Cyan Ink 6

Coloring material (pigment) Pigment Blue 15:4: 4% by mass
Styrene-methacrylic acid ester-methacrylic acid Na salt copolymer (pigment dispersant): 0.4% by mass
Near infrared absorbing aqueous dispersion liquid (hereinafter, the content of the specific compound of the above-described structure (A): 0.24% by mass, a resin dispersant PA-15 (the weight average molecular weight: 17000, and acid value: 11 mgKOH/g): 4.8% by mass): 21% by mass
Propylene glycol: 10% by mass
Diethylene glycol monobutyl ether: 3% by mass
1,2-hexanediol: 0.7% by mass
OLFINE E1010: 0.5% by mass
OLFINE E1004: 0.5% by mass
pH buffer (BES/NaOH aqueous solution.): 2% by mass
Pure water: 57.6% by mass The above-described components were mixed, and then the mixture was filtrated by using 5 μm of filter so as to obtain a cyan ink 6. The ink pH was 7.5. The cyan ink 6 was replaced with the cyan ink 1 of Example 1, and the same evaluation as that in Example 1 was performed. The evaluation results of the nonuniformity of image and the ink storage stability were A.

Example 9

Cyan Ink 7

Coloring material (pigment) Pigment Blue 15:4: 4% by mass
Styrene-methacrylic acid ester-methacrylic acid Na salt copolymer (pigment dispersant): 0.4% by mass
Specific compound (the specific compound of the above-described structure (A)): 0.01% by mass
Propylene glycol: 10% by mass
Diethylene glycol monobutyl ether: 3% by mass
1,2-hexanediol: 0.7% by mass
OLFINE E1010: 2.0% by mass
OLFINE E1004: 1.5% by mass
pH buffer (BES/NaOH aqueous solution): 2% by mass
Pure water: 76.39% by mass The above-described components were mixed, and then the mixture was filtrated by using 5 μm of filter so as to obtain a cyan ink 7. The ink pH was 7.6. The cyan ink 7 was replaced with the cyan ink 1 of Example 1, and the same evaluation as that in Example 1 was performed. The evaluation result of the nonuniformity of image was B, the change rate of the spectral spectrum was 18% and the change rate of other properties was 10%, and thus the evaluation of the ink storage stability was B.

TABLE 1

| | Ink pH | | | | Specific | Resin | Nonuniformity of | Storage stability |
|---|---|---|---|---|---|---|---|---|
| | Cyan | Magenta | Yellow | Black | compound | dispersant | image | of ink |
| Example 1 | 7.7 | 7.4 | 8.0 | 8.0 | (A) | PV-12 | A | A |
| Example 2 | 7.1 | 7.4 | 8.0 | 8.0 | (A) | PV-05 (cyan only) | A | A |
| Example 3 | 6.8 | 7.4 | 8.0 | 8.0 | (A) | PV-15 (cyan only) | A | A |

TABLE 1-continued

|  | Ink pH | | | | Specific | Resin | Nonuniformity of | Storage stability |
|---|---|---|---|---|---|---|---|---|
|  | Cyan | Magenta | Yellow | Black | compound | dispersant | image | of ink |
| Example 4 | 7.7 | 7.4 | 8.0 | 8.0 | (B) (cyan only) | PV-12 | A | A |
| Example 5 | 8.4 | 7.4 | 8.0 | 8.0 | (A) | PV-11 (cyan only) | A | B |
| Example 6 | 8.5 | 7.4 | 8.0 | 8.0 | (A) | PV-12 | A | A |
| Example 7 | 6.5 | 7.4 | 8.0 | 8.0 | (A) | PV-12 | A | A |
| Example 8 | 7.5 | 7.4 | 8.0 | 8.0 | (A) | PA-15 | A | A |
| Example 9 | 7.6 | 7.4 | 8.0 | 8.0 | (A) | None | B | B |
| Comparative Example 1 | 9.5 | 9.5 | 9.5 | 9.5 | (A) | PV-12 | C | C |
| Comparative Example 2 | 5.8 | 5.8 | 5.8 | 5.8 | (A) | PV-12 | A | C |
| Comparative Example 3 | 8.6 | 8.6 | 8.6 | 8.6 | (A) | PV-12 | C | B |
| Comparative Example 4 | 6.4 | 6.4 | 6.4 | 6.4 | (A) | PV-12 | A | C |

As described above, as compared with the ink in comparative examples in which the ink pH is out of a range of 6.5 to 8.5, with the ink in examples, it is possible to realize both of the storage stability of the ink containing a specific compound and the suppression of the image deterioration at the time of performing the ink jet recording.

What is claimed is:

1. An aqueous ink for ink jet recording comprising:
   (a) water;
   (b) a water-soluble organic solvent;
   (c) a coloring material;
   (d) a specific compound having a structure expressed by the following General Formula (I), wherein a content of the specific compound is in a range of 0.001% by mass to 0.5% by mass with respect to the entire ink, and the specific compound is dispersed in the water and the water-soluble organic solvent,

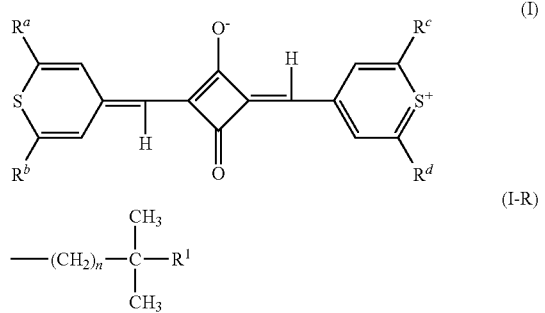

wherein in General Formula (I), $R^a$, $R^b$, $R^c$, and $R^d$ each independently represents a structure expressed by: (i) General Formula (I-R), in which $R^1$ represents a hydrogen atom or a methyl group, n represents an integer in a range of 0 to 3, and a total number of carbon atoms in the structure expressed by General Formula (I-R) is equal to or less than 6; or (ii) an unbranched alkyl group having 1 to 6 carbon atoms; and (e) a resin dispersant that is a vinyl polymer which contains: (i) a constitutional unit expressed by the following General Formula (II), and (ii) a constitutional unit derived from alkyl (meth)acrylate, and the vinyl polymer has an acid value in a range of 6 mgKOH/g to 100 mgKOH/g,

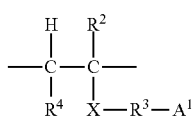

wherein in General Formula (II), $R^2$ represents a hydrogen atom, a methyl group, or —X—$R^3$-$A^1$, $R^4$ represents a hydrogen atom or —X—$R^3$-$A^1$, X represents —C(=O)—, —C(=O)O—, —C(=O)NH—, —OC(=O)—, phenylene, a divalent group of a heterocyclic ring, or a single bond, $R^3$ represents a divalent linking group or a single bond, and $A^1$ represents —$SO_3H$, —COOH, or —$PO_3H_2$, wherein in the constitutional unit expressed by General Formula (II), in a case where two or more —X—$R^3$-$A^1$ are present in the same unit, X, $R^3$, or $A^1$ may be the same or different from each other, and a plurality of constitutional units having different structures are optionally present in the same molecule, and wherein a pH of the aqueous ink is in a range of 6.5 to 8.5.

2. The aqueous ink for ink jet recording according to claim 1, wherein a weight average molecular weight of the resin dispersant is in a range of 3,000 to 200,000.

3. The aqueous ink for ink jet recording according to claim 1, wherein the resin dispersant further includes a polyester resin.

4. The aqueous ink for ink jet recording according to claim 3, wherein the acid value of the polyester resin is in a range of 5 mgKOH/g to 150 mgKOH/g.

5. The aqueous ink for ink jet recording according to claim 1, wherein the coloring material is C.I. Pigment Blue 15:4.

6. The aqueous ink for ink jet recording according to claim 1, wherein the coloring material is C.I. Pigment Red 122.

7. The aqueous ink for ink jet recording according to claim 1, wherein the coloring material is C.I. Pigment Yellow 74.

8. The aqueous ink for ink jet recording according to claim 1, wherein a content of the coloring material is in a range of 0.5% by mass to 10% by mass with respect to the entire ink.

9. The aqueous ink for ink jet recording according to claim 1, further comprising a pH buffer.

10. The aqueous ink for ink jet recording according to claim 1, wherein the water-soluble organic solvent is alkylene glycol.

11. The aqueous ink for ink jet recording according to claim 1, wherein a content of the water is in a range of 40% by mass to 90% by mass with respect to the entire ink.

12. An aqueous ink set for ink jet recording comprising:
water;
a water-soluble organic solvent;
a black ink containing carbon black as a coloring material; and
one or more types of color inks which are the aqueous ink for ink jet recording according to claim 1, and of which the coloring materials thereof are chromatic color materials.

13. An ink jet recording method comprising:
performing recording in such a manner that the aqueous ink for ink jet recording according to claim 1 is ejected from a recording head so as to be applied onto a recording medium, and then the ink on the recording medium is irradiated with near infrared laser having a center wavelength in a range of 750 nm to 950 nm so as to dry the ink.

14. The ink jet recording method according to claim 13, wherein the recording is performed by repeatedly performing a process of applying the ink onto the recording medium for each color ink, and then irradiating the ink applied on the recording medium with the near infrared laser having the center wavelength in a range of 750 nm to 950 nm.

15. The ink jet recording method according to claim 13, wherein the recording is performed by repeatedly performing a process of applying the ink onto the recording medium for each color ink, and then irradiating the ink applied on the recording medium with the near infrared laser having the center wavelength in a range of 750 nm to 950 nm, and after the ink to be recorded last is applied to the recording medium, the recording medium is heated without being irradiated with the near infrared laser so as to dry the ink.

16. The ink jet recording method according to claim 13, wherein after applying the ink for all colors onto the recording medium, the ink on the recording medium is irradiated with the near infrared laser having a center wavelength in a range of 750 nm to 950 nm.

* * * * *